US012567892B2

(12) United States Patent
Achterberg et al.

(10) Patent No.: US 12,567,892 B2
(45) Date of Patent: Mar. 3, 2026

(54) DATA TRANSMISSION IN A LINEAR TRANSPORT SYSTEM

(71) Applicant: Beckhoff Automation GmbH, Verl (DE)

(72) Inventors: Jan Achterberg, Duisburg (DE); Andreas Brinker, Bakum (DE); Manuel Bettenworth, Vienna (AT); Thomas Vorbohle, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 625 days.

(21) Appl. No.: 17/947,918

(22) Filed: Sep. 19, 2022

(65) Prior Publication Data

US 2023/0015917 A1    Jan. 19, 2023

Related U.S. Application Data

(63) Continuation of application No. PCT/EP2021/057104, filed on Mar. 19, 2021.

(30) Foreign Application Priority Data

Mar. 20, 2020    (DE) ..................... 10 2020 107 783.1

(51) Int. Cl.
H04B 7/06        (2006.01)
B60L 13/03       (2006.01)
(Continued)

(52) U.S. Cl.
CPC ............ H04B 7/0602 (2013.01); B60L 13/03 (2013.01); B65G 54/02 (2013.01); H04B 5/26 (2024.01); H04B 5/266 (2024.01)

(58) Field of Classification Search
CPC .......... H04B 7/0602; H04B 5/72; H04B 5/26; H04B 5/266; B60L 13/03; B65G 54/02; Y02T 90/16
See application file for complete search history.

(56) References Cited

U.S. PATENT DOCUMENTS 4,897,854 A * 1/1990 Harris ................. H04L 25/4902
                                                375/258
6,335,933 B1 * 1/2002 Mallory ............... H04L 1/1635
                                                370/473
(Continued)

FOREIGN PATENT DOCUMENTS

CN          109217768 A     1/2019
CN          209635251 U    11/2019
(Continued)

OTHER PUBLICATIONS

"ISO/IEC 14443," Wikipedia, Dec. 16, 2022 (2 pages).
(Continued)

*Primary Examiner* — Yuwen Pan
(74) *Attorney, Agent, or Firm* — Dorsey & Whitney LLP

(57)          ABSTRACT

A method for transferring data between movable and stationary units of a linear transport system having a controller and linear motor with stator and rotor for driving the movable unit along a guide rail. The stator includes the stationary units, each with one or more drive coils. The rotor is arranged on the movable unit, with one or more magnets. The stationary units each have at least one stationary antenna, and the movable unit has a movable antenna. The controller selects a stationary antenna based on position data of the moveable antenna and outputs a data packet to the stationary unit, with control and data signals transmitted via the selected stationary antenna. The control signal includes identification information to identify the stationary antenna. The data signal includes a communication frame with a start bit and user data following a start sequence arranged to trigger data receipt of the movable unit.

20 Claims, 16 Drawing Sheets

(51) Int. Cl.
   *B65G 54/02*     (2006.01)
   *H04B 5/26*     (2024.01)

(56) References Cited

U.S. PATENT DOCUMENTS

| | | | |
|---|---|---|---|
| 6,473,438 B1 | 10/2002 | Cioffi et al. | |
| 6,499,701 B1 | 12/2002 | Thornton et al. | |
| 7,623,836 B1 * | 11/2009 | Finkelstein | H04L 27/2647 |
| | | | 455/278.1 |
| 8,310,340 B2 | 11/2012 | Sikora et al. | |
| 8,503,451 B2 * | 8/2013 | Mallory | H04L 1/1877 |
| | | | 370/473 |
| 8,805,459 B2 * | 8/2014 | Pohlabeln | H01Q 1/242 |
| | | | 455/575.1 |
| 9,079,724 B2 | 7/2015 | Van De Loecht et al. | |
| 9,705,663 B2 * | 7/2017 | Kang | H02J 7/00036 |
| 9,806,647 B2 | 10/2017 | Prüssmeier et al. | |
| 10,128,733 B2 | 11/2018 | Prüssmeier et al. | |
| 10,167,143 B2 | 1/2019 | Senn et al. | |
| 10,454,355 B2 | 10/2019 | Weber et al. | |
| 2002/0180279 A1 | 12/2002 | Faizullabhoy et al. | |
| 2003/0230941 A1 * | 12/2003 | Jacobs | B65G 47/841 |
| | | | 310/12.19 |
| 2011/0286542 A1 * | 11/2011 | Shelburne | H04L 27/12 |
| | | | 375/272 |
| 2014/0314170 A1 * | 10/2014 | Plumb | H04W 52/0261 |
| | | | 375/282 |
| 2017/0310262 A1 * | 10/2017 | Albert | B60L 15/005 |
| 2021/0046826 A1 | 2/2021 | Prüssmeier et al. | |
| 2021/0159834 A1 | 5/2021 | Schönke et al. | |

FOREIGN PATENT DOCUMENTS

| | | | |
|---|---|---|---|
| DE | 102012204917 A1 | | 10/2013 |
| DE | 102013218391 A1 | | 3/2015 |
| DE | 102014117200 A1 | | 5/2016 |
| DE | 102015102236 A1 | | 8/2016 |
| DE | 102018111715 A1 | | 11/2019 |
| DE | 102018118814 A1 | | 2/2020 |
| EP | 2007022 A1 | | 12/2008 |
| JP | 2005027248 A | * | 1/2005 |
| WO | 9534149 A1 | | 12/1995 |
| WO | 0102211 A1 | | 1/2001 |
| WO | 2014008893 A1 | | 1/2014 |

OTHER PUBLICATIONS

ISO/IEC 14443 "Cards and security devices for personal identification," Parts 1-4 (informative sections), 2018 (13 pages).

Office Action dated Jan. 19, 2021 in connection with German patent application No. 10 2020 107 783.1 (24 pages including English translation).

International Search Report and Written Opinion dated Jun. 29, 2021 in connection with International Patent Application No. PCT/EP2021/057104, 37 pages including English translation.

International Preliminary Report on Patentability dated Sep. 14, 2022 in connection with International Patent Application No. PCT/EP2021/057104, 28 pages.

Office Action dated Nov. 3, 2023 in connection with Chinese patent application No. 202180022715.5, 12 pages including English translation.

"EtherCAT—the Ethernet Fieldbus," EtherCAT Technology Group, Nov. 2012, 21 pages.

* cited by examiner

Fig. 13

DATA TRANSMISSION IN A LINEAR TRANSPORT SYSTEM

CROSS-REFERENCE TO RELATED APPLICATIONS

The present patent application claims priority of International Patent Application PCT/EP2021/057104, filed Mar. 19, 2021, entitled "Data Transmission in a Linear Transport System," which claims priority to German patent application DE 10 2020 107 783.1, filed Mar. 20, 2020, entitled "Datenübertragung in einem Linearen Transportsystem," each of which is incorporated by reference herein, in the entirety and for all purposes.

FIELD

The present invention relates to a method for transferring data in a linear transport system, a controller for controlling the method, a computer program for carrying out the method, a machine-readable storage medium for the computer program. Furthermore, the present invention relates to a stationary unit, a movable unit and a linear transport system.

BACKGROUND

The prior art discloses linear transport systems in which a movable unit may be moved along a guide rail and which have a linear motor for driving the movable unit, the linear motor comprising a stator and a rotor. In this context, the stator may comprise at least one motor module arranged in a stationary manner along the guide rail and having one or a plurality of drive coils, while the movable unit is arranged on the carriage and may comprise one or a plurality of magnets. By energizing the drive coils, a force may be generated on the magnets of the movable unit in such a way that the movable unit moves along the guide rail. It may further be provided that the movable unit or the carriage comprises a tool, wherein energy may be transferred from the stationary unit to the movable unit to operate the tool, and data may be transferred both from the stationary unit to the movable unit and from the movable unit to the stationary unit. German patent application DE 10 2018 111 715 A1 discloses a linear transport system in which data may be transferred between a stationary unit and a movable unit with the aid of data coils. In order to carry out such a transfer of data, it may be provided to use a communication in which the data coils may transmit or receive, but not both at the same time. In this context, the movable unit must recognize that a data transmission to it is to be carried out and whether a data transmission back to the stationary unit is also to be carried out.

SUMMARY

The present invention provides an improved method for transmitting data in a linear transport system. The invention further provides a controller for controlling the method, a computer program for performing the method, and a machine-readable storage medium for the computer program. The invention further provides a stationary unit, a movable unit, and a linear transport system for implementing the method.

According to a first aspect, a linear transport system comprises a plurality of stationary units and at least one movable unit, as well as a guide rail for guiding the movable unit, a controller, and a linear motor for driving the movable unit along the guide rail. The linear motor comprises a stator and a rotor, the stator comprising the stationary units, each comprising one or a plurality of drive coils. The rotor is arranged on the movable unit and comprises one or a plurality of magnets. The stationary units each comprise at least one stationary antenna. The movable unit comprises a movable antenna. The movable antenna is fixed to the movable unit, but may move along the guide rail together with the movable unit. In a method for transmitting data between the movable unit and the stationary unit of the linear transport system, the following steps are carried out by the controller. At first, position data of the movable antenna of the movable unit are detected. Then, a stationary antenna within the linear transport system is selected based on the position data of the movable antenna. Subsequently thereto, a data packet is output to the stationary unit. The data packet includes a control signal, wherein the control signal includes identification information that may be used to identify the selected stationary antenna. Furthermore, the data packet comprises a data signal to be transmitted via the selected stationary antenna, the data signal including a start sequence. The start sequence is configured to trigger a data receipt of the movable unit. Subsequent to the start sequence, the data signal comprises a first communication frame, the first communication frame comprising a start bit and user data to be transmitted.

The identification information may be used to select the stationary antenna within the linear transport system that is closest to the moving antenna of the movable unit. This allows for efficient data transmission with as little interference as possible. With the aid of the start sequence of the data signal, the data receipt of the movable unit is triggered. This means that the movable unit receives via the movable antenna and detects the transmission when the start sequence is received. The data packet may thereby be output from a controller to a stationary unit. This may be done with the aid of a data transmission between the controller and the stationary unit. It may be provided that the stationary unit comprises only one stationary antenna. In this case, this stationary antenna is selected. If the stationary unit comprises a plurality of stationary antennas, one of the stationary antennas may be selected with the aid of the identification information.

It may be provided that the linear transport system comprises a field bus, wherein the controller and the stationary units are bus subscribers and communication between the controller and the stationary units takes place via the field bus. A fieldbus protocol, a bus master and slaves may be provided for this purpose.

According to a second aspect, a stationary unit of a linear transport system comprises a stator having one or a plurality of drive coils for driving a rotor. Furthermore, the stationary unit comprises one or a plurality of stationary antennas. The stationary unit is embodied to receive a data packet, e.g. from the controller. The data packet comprises a control signal comprising identification information for identifying a stationary antenna, and a data signal to be transmitted. The stationary unit is configured to select the stationary antenna based on the identification information and to transmit the data signal via the stationary antenna. The data signal includes a start sequence and a start bit following the start sequence. The data signal includes a first communication frame following the start sequence, the first communication frame configured the start bit and user data to be transmitted.

According to a third aspect, a movable unit of a linear transport system comprises a movable antenna. A rotor is disposed on the movable unit and comprises one or a plurality of magnets. The movable unit is embodied to receive a data signal via the movable antenna. The data signal includes a start sequence and a start bit following the start sequence. The data signal further comprises user data following the start bit, wherein the movable unit is configured to identify the start sequence and subsequently record the user data transmitted after the start bit.

According to a fourth aspect, a method for initializing a transport system, in particular the linear transport system described above, is presented. The transport system comprises a controller, stationary units and movable units, the stationary units each comprising at least one stationary antenna and the movable units each having a movable antenna. The following steps are carried out by the controller. At first, position data of the movable antenna of the movable unit to be initialized are determined. Then, at least a stationary antenna of one of the stationary units within the transport system is selected based on the position data of the movable antenna. Then, a data packet is output to the stationary unit, the data packet comprising an initialization sequence. Now, a unique allocation address of the movable unit is determined.

This method makes it possible to address the movable units on the basis of the unique allocation addresses and thus to control a communication or to determine which of the movable units is to be the recipient of a telegram.

EXAMPLES

In an embodiment of the method, the start sequence comprises a plurality of switching edges and at least three inverted stop bits. Such a start sequence, which is in principle based on the UART standard, but modified, is particularly well suited for communication with a movable unit. The start sequence may comprise the decimal byte value 85.

In an embodiment of the method, the first communication frame comprises first header data, the first header data containing information about a telegram type, wherein the first communication frame is set based on the telegram type. This may be used to inform the movable unit what type of communication is to take place in the first communication frame and to determine how the transmitted data is interpreted by the movable unit.

In an embodiment of the method, the telegram type comprises receipt information of a second communication frame. This may instruct the stationary unit to receive data from the movable unit after transmitting the data signal in the first communication frame. In turn, the movable unit may be instructed to transmit data in the second communication frame by the receipt information received in the previous first communication frame 341.

In an embodiment of the method, the telegram type comprises a length of the first communication frame. The receipt information comprises a length of the second communication frame. This allows the communication between the movable unit and the stationary unit to be controlled more precisely. The respective receiver of a communication then knows exactly how much data to expect and when a transmission is finished without having to receive a special bit sequence at one end of the transmission. This may save transmission time. Furthermore, it is advantageous if the length of the second communication frame is also comprised via the information in the first header data of the first communication frame and the movable unit cannot respond with data that are too long, which could e.g. lead to cycle time violations.

In an embodiment of the method, a communication cycle consisting of the first communication frame, a switching pause and the second communication frame lasts a predetermined period of time, e.g. a maximum of 250 microseconds. This makes it possible to ensure that the movable unit cannot move so far within a communication cycle that the stationary antenna selected with the aid of the identification information may no longer communicate with the movable antenna. This is because at a given maximum speed of the movable unit, e.g. 4 meters per second, the movable unit moves one millimeter within 250 microseconds. In this case, the movable unit has not yet moved out of a range of influence of the selected stationary antenna. In order to comply with the predetermined time period, it may e.g. be provided to define a maximum number of bytes to be transmitted in the first communication frame and second communication frame, respectively.

In an embodiment of the method, the telegram type comprises information about a type of user data to be transmitted. This may e.g. be used to instruct the movable unit to transmit specific data.

In an embodiment of the method, the first header data comprise an address of the movable unit. This allows for an addressing, in particular if there are a plurality of movable units within the linear transport system. This makes it possible for movable units to receive a data signal but to discard the received communication due to an incorrect address, i.e., an address that is not allocated to that particular movable unit.

In an embodiment of the method, the first header data comprise communication control information. In an embodiment of the method, the first header data comprise values for carrying out a cyclic redundancy check. This makes it possible to check whether communication has taken place completely and without errors.

In an embodiment of the method, the first communication frame comprises a time stamp. This may allow for synchronizing a clock arranged on the movable unit.

In an embodiment of the method, a first data packet is output to the one of the stationary units, and based on the first data packet, a communication between the stationary unit and a movable unit occurs. A second data packet is output to the same or a different stationary unit, and communication between the stationary unit and a movable unit is carried out based on the second data packet, wherein the movable units differ.

A controller is set up to execute one of the methods according to the invention. For this purpose, the controller is particularly set up to create the data packet and output it to a stationary unit, in particular via a communication interface. A distributor may be arranged between the controller and the stationary units.

A computer program comprises program code which, when executed on a computer, causes the computer to execute the method according to the invention. Such a computer program may be stored within the controller. A machine-readable storage medium may comprise the computer program.

In an embodiment of the stationary unit, the data signal comprises first header data, wherein the first header data is also associated with the first communication frame.

In an embodiment, the stationary unit is further configured to evaluate receipt information of a second communication frame and to receive the second communication frame based on the receipt information.

In an embodiment, the stationary unit is arranged to receive a plurality of data packets, each data packet comprising a control signal so that simultaneous transmissions may be made via a plurality of stationary antennas.

In an embodiment, the stationary unit is further configured to output the start sequence at a predetermined point in time based on a synchronization signal. This may support synchronization of the movable unit. It may be provided that the stationary unit comprises a synchronized clock for this purpose, wherein the synchronized clock is synchronized with the controller.

In an embodiment, the movable unit is further embodied to receive receipt information of a second communication frame and to transmit the second communication frame based on the receipt information.

In an embodiment, the movable unit is further embodied to transmit status information within the second communication frame.

In an embodiment, the movable unit is further embodied to carry out time synchronization based on the start sequence using an additional received time stamp.

The invention further comprises a linear transport system having a controller according to the invention, at least a stationary unit according to the invention, and at least a movable unit according to the invention, wherein the stator and the rotor form a linear motor.

In an embodiment of the method for initializing a transport system, the initialization sequence comprises a ticket number. At least two stationary antennas are selected, wherein the movable antenna is arranged in the area of influence of the two selected stationary antennas. This is particularly useful if a plurality of movable antennas are each arranged in the area of influence of the stationary antennas, e.g. due to an operating state of the linear transport system, which should not be disturbed by position changes. If a unique allocation of a stationary antenna to the movable antenna of the movable unit that is to be initialized is possible, an address may be transmitted via the stationary antenna and a predetermined command. The data packet includes control information such that the ticket number is to be output at least once at different times by each of the two selected stationary antennas. It may also be provided to transmit a plurality of data packets for one stationary unit to address adjacent antennas of two stationary units.

The two selected stationary antennas may be arranged on different spatial sides of the movable unit. In a linear transport system in particular, the stationary antennas may be arranged on different sides of the movable unit in one direction of movement. Other movable units that are not currently to be initialized may also be arranged in the area of influence of one of the selected stationary antennas. However, since only the movable unit to be initialized is arranged in the area of influence of both selected antennas, a movable unit may determine from the number of ticket numbers received that precisely this movable unit is currently to be initialized. This may e.g. be done by incrementing a counter in the movable unit by one each time a ticket number initialization sequence is received, comparing the counter to a predetermined value, and outputting a unique allocation address if the counter exceeds the predetermined value. In this case, the unique allocation address may be an identification number already allocated during production of the movable unit.

The allocation address may e.g. be a serial number of the movable unit, which is then transmitted to the stationary unit afterwards. The initialization sequence with the ticket number may alternatively simultaneously include an address (e.g., an address generated by the controller), which is received by the movable unit and accepted when the meter count is reached. In this case, the address may be transmitted to the stationary unit or the controller, respectively, making it possible to check whether the correct address has been transmitted.

In an embodiment of the method for initializing a transport system, the ticket number is output multiple times by each of the selected stationary antennas. This may reduce effects of transmission errors if, e.g., each of the selected stationary antennas transmits the ticket number four times and the predetermined value to which the counter is compared is six. A movable unit that is to be initialized must then correctly receive only six out of eight transmissions of the ticket number. However, a movable unit that is in the sphere of influence of only one of the selected stationary antennas will receive only four transmissions of the ticket number even without a transmission error, so that the counter for such a movable unit remains below the specified value.

In an embodiment of the method for initializing a transport system, control commands are additionally output for a drive of the transport system, e.g. for the linear motor of the linear transport system. The control commands may be used to control a drive of the transport system in such a way that the movable antenna of the movable unit to be initialized is moved into the area of influence of one or of a plurality of stationary antennas.

This makes it possible to improve the selection of stationary antennas and further also to initialize the movable unit using only one stationary antenna. In this case, the movable unit to be initialized may be brought into the area of influence of this stationary antenna and all other movable units may be brought to positions outside of the area of influence of this stationary antenna.

In an embodiment of the method for initializing a transport system, the unique allocation address of the movable unit is determined in such a way that a character string transmitted by the movable unit to be initialized via the movable antenna is stored as the unique allocation address. This character string may be a character string already allocated during production of the movable unit.

In an embodiment of the method for initializing a transport system, a 3-bit address is then output to the stationary unit, wherein the 3-bit address is to be transmitted to the movable unit. This 3-bit address may correspond to the 3-bit address already described in the first header data. The movable unit may be arranged to receive the 3-bit address.

In an embodiment of the method for initializing a transport system, the determination of the unique allocation address is determined such that a character string and a 3-bit address are determined by the controller and output to the stationary unit. The character string and the 3-bit address are to be transmitted to the movable unit. Thus, a character string may be determined for the movable unit if no character string has been allocated during production of the movable unit. Furthermore, this method may be used to replace a character string allocated during production of the movable unit.

In an embodiment of the method for initializing a transport system, the method is repeated for another movable unit. In particular, the method is repeated for all movable units.

BRIEF DESCRIPTION OF THE DRAWINGS

The invention will be discussed in more detail below with the aid of examples of embodiments and with reference to figures. Here, in schematic illustration in each case:

FIG. 13 shows second header data;

DETAILED DESCRIPTION

In the following, the same reference signs may be used for the same features. Furthermore, for the sake of clarity, it may be provided that not all elements are shown in each figure. Furthermore, for the sake of clarity, it may be provided that not every element is provided with its own reference sign in every drawing.

Figure 1:
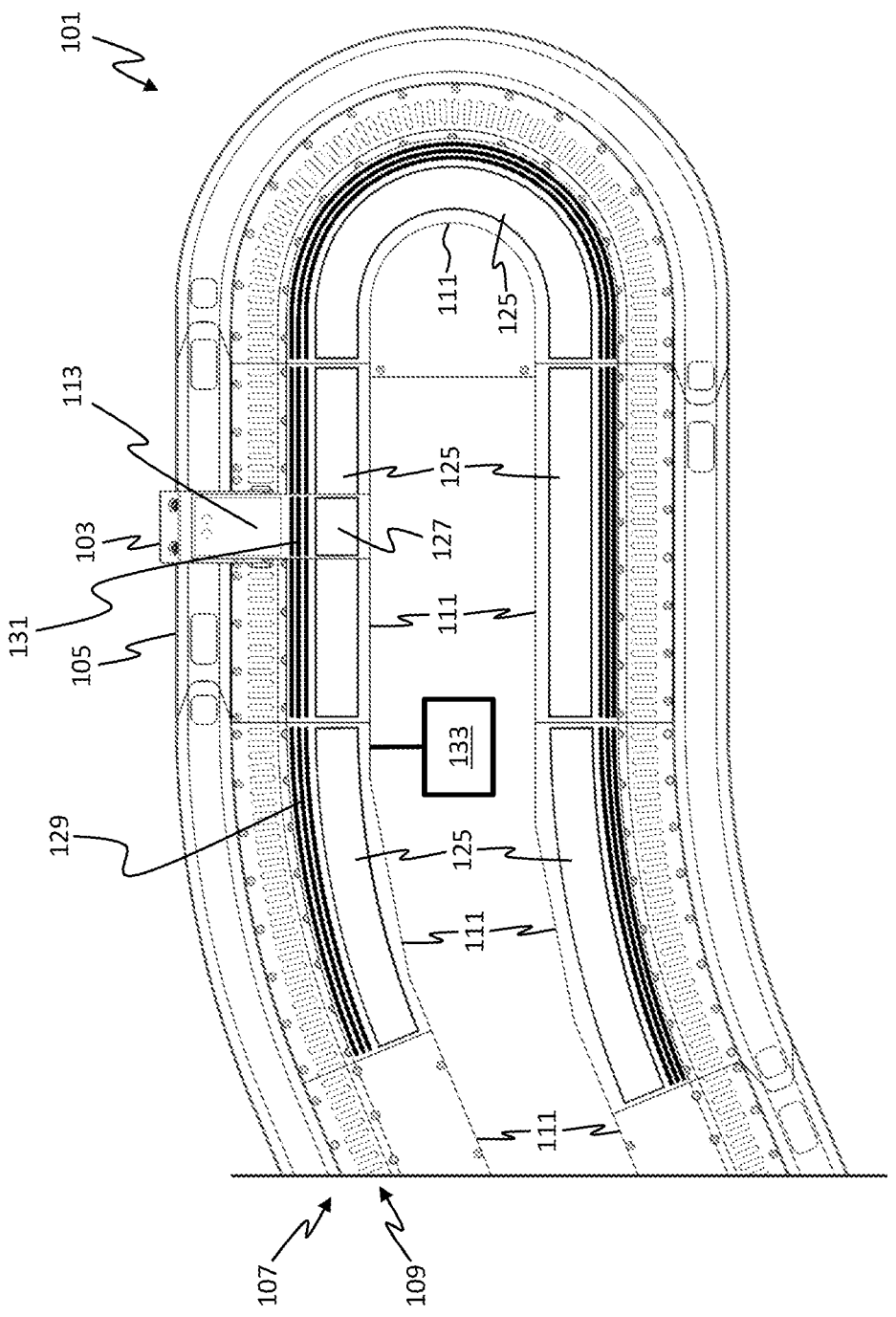
FIG. 1 shows a linear transport system.

FIG. 1 shows a linear transport system 101. The linear transport system 101 comprises a movable unit 103 guided by a guide rail 105. The movable unit 103 comprises track rollers and a rotor 113 with magnets. The rollers of the movable unit 103 may roll on track surfaces of the guide rail 105.

The linear transport system 101 further comprises a linear motor 107, the linear motor 107 having a stator 109. The stator 109 of the linear motor 107 is located in the stationary units 111, each of which has a plurality of drive coils for this purpose. In this regard, the stationary units 111 in FIG. 1 have a partially different configuration, and individual stationary units 111 may be straight or curved. The linear motor 107 further comprises the rotor 113, which is arranged on the movable unit 103 and comprises one or a plurality of magnets. The stationary units 111 each comprise an energy-transmitting coil 125. The movable unit 103 comprises an energy-receiving coil 127. In an alternative embodiment in FIG. 1, a stationary unit 111 may also comprise multiple energy-transmitting coils 125.

The stationary units 111 further comprise stationary antennas 129. The movable unit 103 comprises a movable antenna 131. The movable antenna 131 is fixed to the movable unit 103, but may move along the guide rail 105 in conjunction with the movable unit 103. With the aid of the stationary antennas 129 and the movable antenna 131, data may be exchanged between the stationary units 111 and the movable unit 103. Alternatively, however, such data transmission may also be embodied, e.g. with the aid of a wireless LAN or a Bluetooth or an infrared connection or a 5G connection or according to the DECT standard or as optical transmission. The stationary unit 111 then does not comprise the stationary antenna 129, and the movable unit 103 then does not comprise the movable antenna 131, in each case as shown in FIG. 1. However, other antennas may be arranged on the movable unit 103. The stationary antennas and/or the movable antennas may be arranged completely independently of the embodiment shown in FIG. 1.

The linear transport system 101 further comprises a controller 133 that is directly connected to either one of the stationary units 111 or all of the stationary units 111. Shown in FIG. 1 is a connection to one of the stationary units 111, in which case it may be provided that the stationary units 111 comprise a communication bus via which signals from the controller 133 may be exchanged between the stationary units 111. Furthermore, other communication units in FIG. 1 may be arranged between the controller 133 and the stationary unit 111 or the stationary units 111.

Figure 2:
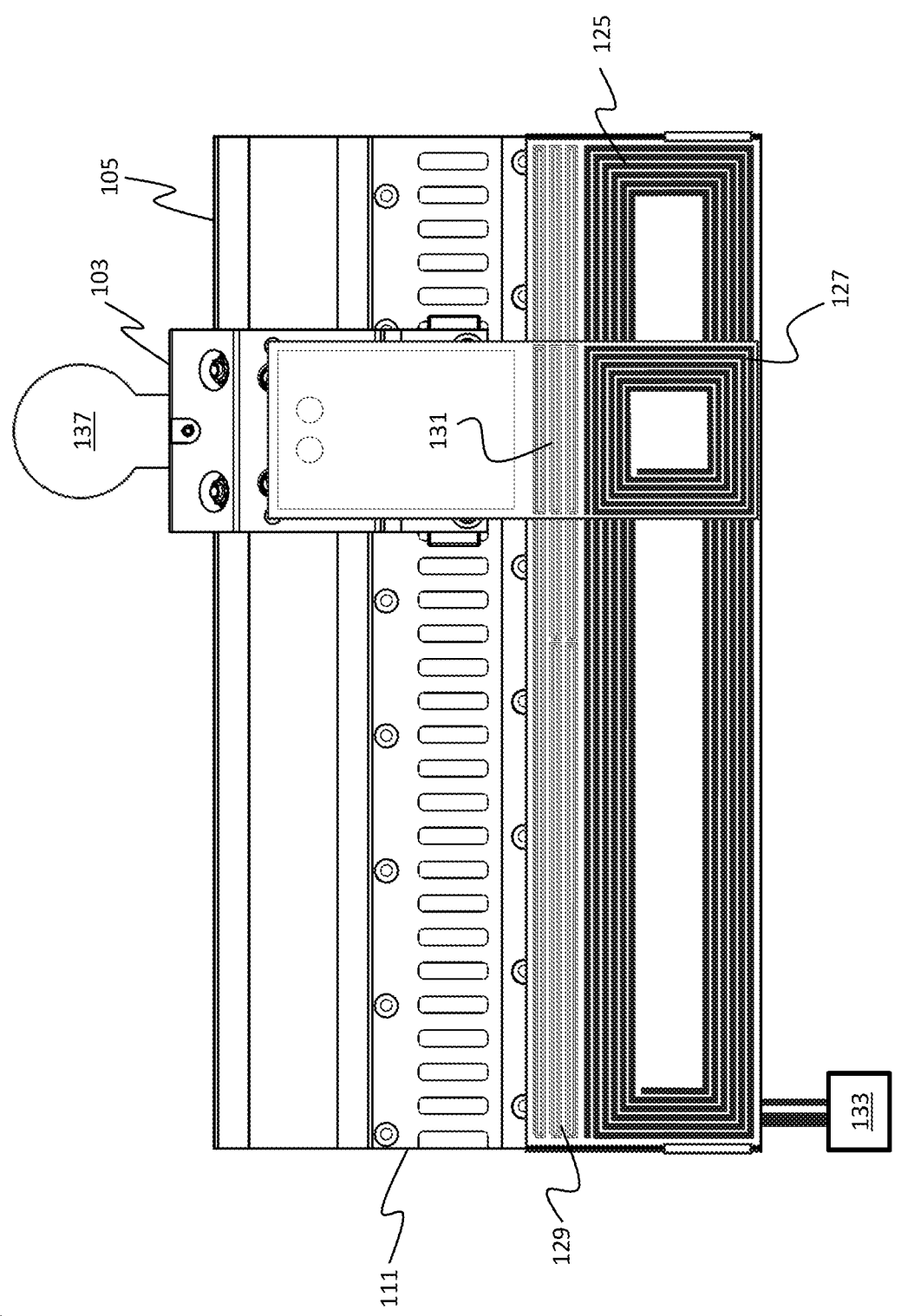
FIG. 2 shows a section of the linear transport system of FIG. 1.

FIG. 2 shows a more detailed view of a stationary unit 111 at which a movable unit 103 is arranged. The movable unit 103 comprises a tool 137 which may e.g. be configured as an electric tool. In order to operate the tool 137, energy transmission from the stationary unit 111 to the movable unit 103 may be necessary. This may be done via the energy-transmitting coil 125 of the stationary unit 111 and the energy-receiving coil 127 of the movable unit 103. When the energy-transmitting coil 125 is energized, e.g. with an alternating current, a corresponding magnetic field is generated, which induces a current in the energy-receiving coil 127. This induced current may then be used to supply power to the tool 137 of the movable unit 103. Furthermore, the stationary unit 111 comprises the stationary antenna 129 and the movable unit 103 comprises the movable antenna 131. Regardless, the method of energy transmission may be carried out differently, e.g. via another type of non-contact energy transmission or via slip rings. Data transmission may nevertheless take place with the aid of the stationary antennas 129 and the movable antenna 131.

Figure 3:
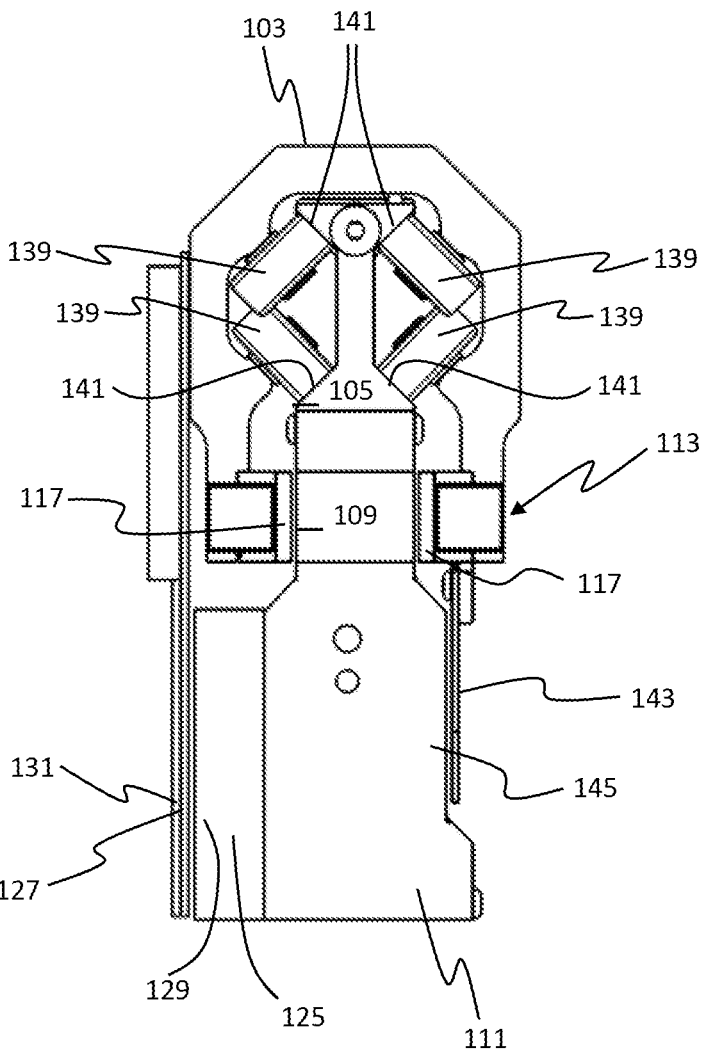
FIG. 3 shows a lateral top view of the section of the linear transport system of FIG. 2.

FIG. 3 shows a lateral top view of a stationary unit 111 having a movable unit 103 arranged thereon. Rollers 139 of the movable unit 103 may roll on track surfaces 141 of the guide rail 105, allowing substantially one-dimensional movement of the movable unit 103 along the guide rail 105. Also shown in FIG. 3 are magnets 117 of the movable unit 103, which form the rotor 113 of the linear motor 107. Additionally shown is the stator 109 of the linear motor 107, which is formed from stator teeth and drive coils. Below the magnets 117 and the stator 109, the movable unit 103 has a position detection element 143. The stationary unit 111 comprises a position sensor 145 in this area. The position sensor 145 may e.g. measure an induction behavior of a coil changed by a metal piece embedded in the position detection element 143. For this purpose, the position sensor 145 may e.g. comprise a current-carrying coil in which, due to a change in induction, a passing of the position detection element 143 leads to a change in the current in the coil, and thus the position of the position detection element 143 and thus of the movable unit 103 may be detected. However, the position sensor 145 may of course also be configured differently, e.g. with an excitation coil and a receiving coil, respectively, via which an inductance of the metal piece embedded in the position detection element 143 is measured, as well. Furthermore, e.g. magnets 117 embedded in the position detection element 143 or a light barrier evaluation for position determination are possible.

In a method for transmitting data between the stationary unit 111 and the movable unit 103 of the linear transport system 101, the following steps may be carried out by the controller 133: At first, position data of the movable antenna 129 of the movable unit 103 are determined. These position data of the movable antenna 129 may include a position of the movable unit 103 relative to the stationary units 111 of the linear transport system 101. In this context, it may be provided that the position data are determined with the aid of the position sensor 145. Subsequently, one of the stationary antennas 129 is selected. In this context, it may be provided that the stationary antenna 129 is selected such that it faces the movable antenna 131 of the movable unit 103. A data packet is subsequently output to the stationary unit 111, the data packet comprising a control signal. The control signal includes identification information that may be used to identify the stationary antenna 129. Furthermore, the data packet comprises a data signal to be transmitted via the stationary antenna 129, the data signal comprising a start sequence and a first communication frame following the start sequence. The start sequence is arranged to trigger a data receipt of the movable unit 103. The first communication frame comprises a start bit and user data to be transmitted.

Figure 4:
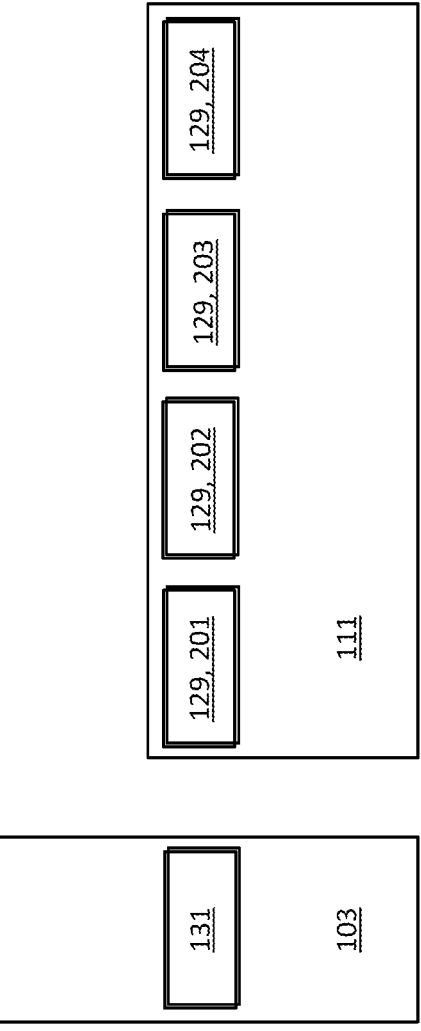
FIG. 4 shows an arrangement of stationary antennas in a stationary unit and of a movable antenna in a movable unit.

FIG. 4 shows a schematic view of four stationary antennas 129 of a stationary unit 111 as well as a movable antenna 131 of a movable unit 103, each of which may be configured as described in FIGS. 1 to 3. The stationary unit 111 has a first stationary antenna 201, a second stationary antenna 202, a third stationary antenna 203, and a fourth stationary antenna 204, each of which is arranged one behind the other. In this context, one behind the other means that when the movable unit 103 moves along the guide rail 105, the movable antenna 131 first moves past the first stationary antenna 201, then the second stationary antenna 202, then the third stationary antenna 203, and finally the fourth stationary antenna 204. A different number of stationary antennas 129 may be provided, and the number of stationary antennas 129 for each stationary unit 111 is not limited to four.

Figure 5:
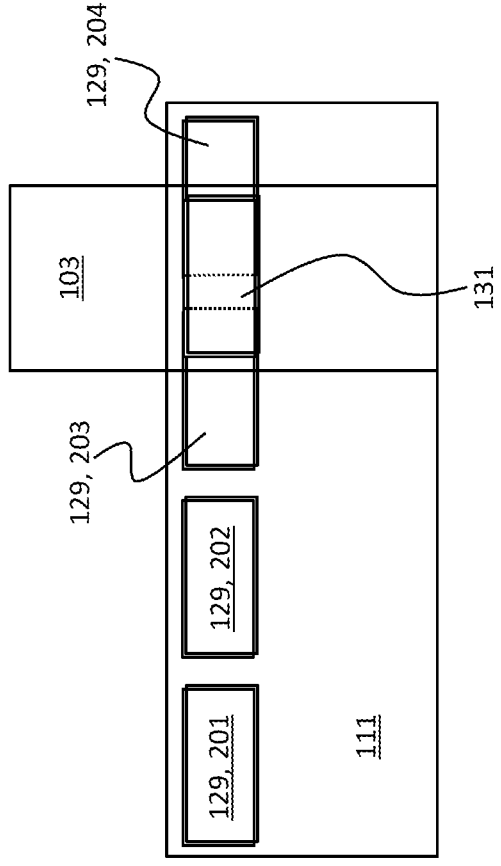
FIG. 5 shows the antennas of FIG. 4 during a movement of the movable unit.

FIG. 5 shows the stationary antennas 129 of the stationary unit 111 and the movable antenna 131 of the movable unit 103 of FIG. 4 during such movement. The movable unit 103 has already reached the area of the fourth stationary antenna 204. Based on the position data of the movable unit 103, which may e.g. be determined with the aid of the position sensor 145 or from the energization of the drive coils, the fourth stationary antenna 204 is selected for transmission. The data packet output to the stationary unit 111 includes the identification information as a control signal, via which the fourth stationary antenna 204 may be identified. Thus, it is achieved that the data signal is transmitted to the movable unit 103 with the aid of the fourth stationary antenna 204. Based on the position of the movable unit 103, it may be identified that the fourth stationary antenna 204 has the optimal functional interaction with the movable antenna 131. Alternatively or additionally, using the position, speed, and a known dead time of the system, it may be determined that at the effective transmission time, the fourth stationary antenna 204 will have the optimal functional interaction with the movable antenna 131.

Figure 6:
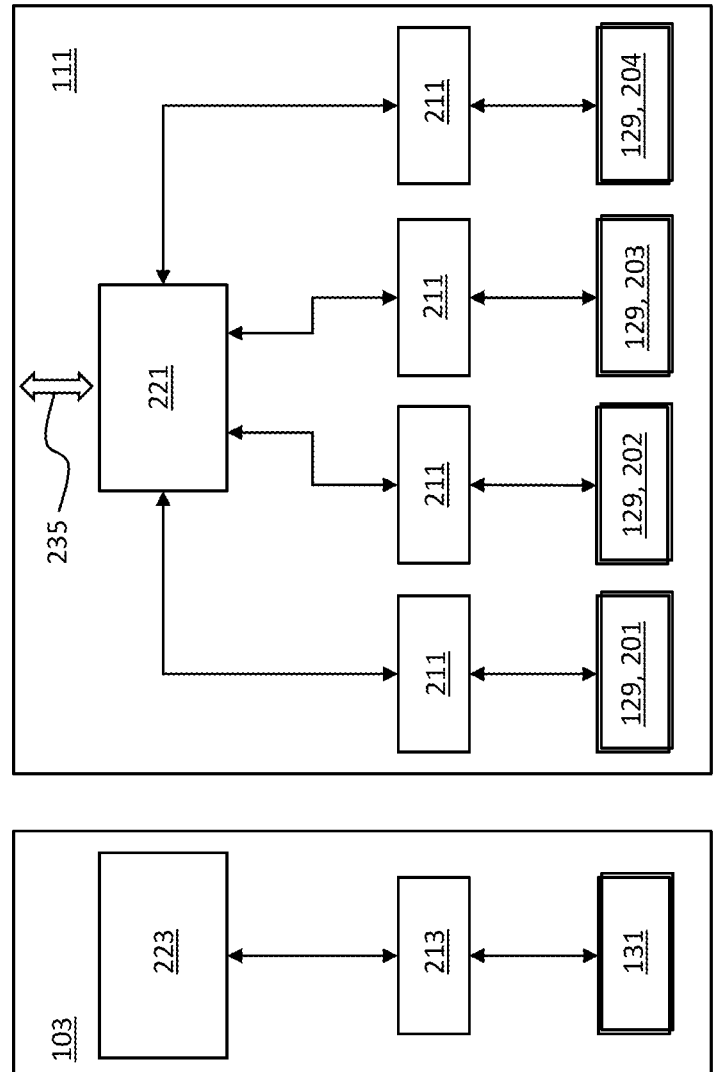
FIG. 6 shows a circuit diagram of the stationary antennas and the movable antenna.

FIG. 6 schematically shows how the stationary antennas 129 of FIGS. 4 and 5 are interconnected within the stationary unit 111, as well as how the movable antenna 131 is interconnected within the movable unit 103. The stationary unit has four first chips 211 for wireless transmission, each connected to one of the stationary antennas 129. If there are more or fewer stationary antennas 129, the number of first chips 211 for wireless transmission may also be adjusted. The first chips 211 are connected to a first microcontroller 221. With the aid of the first microcontroller 221, the first chips 211 for wireless transmission may be controlled and thereby it may be achieved that the data signal is output via one of the stationary antennas 129. For this purpose, the first microcontroller 221 has a communication interface 235 that allows the first microcontroller 221 to receive the data packet from the controller 133. Based on the control signal of the data packet, the microcontroller 221 may select the first chip 211 with the aid of which the transmission is to take place. The communication interface 235 may e.g. be an EtherCAT interface. The movable unit 103 includes the movable antenna 131 and a second chip 213 for wireless transmission and a second microcontroller 223. Via the movable antenna 131, the data packet may be received. With the aid of the second chip 213 for wireless transmission, the data packet is passed on to the second microcontroller 223. From there, data may be passed on to the tool 137. The first microcontroller 221 or the second microcontroller 223 may alternatively be configured as a controller or control device. The first chip 211 and the second chip 213, respectively, may be configured as RFID chips.

The communication between the stationary unit 111 and the movable unit 103 is fully-duplex-capable, thus, data may be transmitted from the stationary unit 111 to the movable unit 103 as well as from the movable unit 103 to the stationary unit 111.

A power supply to the movable antenna 131, second chip 213, second microcontroller 223 as well as tool 137 may be provided by the energy-transmitting coil 125 or energy-receiving coil 127 shown in FIGS. 1 to 3. It may be provided that the movable unit 103 comprises an energy storage device, wherein the energy storage device may be a capacitor, accumulator, battery, supercap or supercapacitor, superconducting magnetic energy storage device, or a flywheel. This allows energy to be stored, e.g. to be used for actions of the tool 137 that require a larger amount of power in the short term than may be provided with the aid of the energy-transmitting coil 125. A larger amount of energy may thus be transmitted in advance for a longer period of time and stored temporarily in the energy storage device. Furthermore, energy may be stored in this way in order to bridge larger areas without energy transmission and still be able to maintain communication there with the aid of the movable antenna 131 or in order to carry out an action of the tool 137 there. Energy storage may also be provided exclusively for supplying energy to the movable unit 103, and the energy-transmitting coils 125 or energy-receiving coils 127 may be omitted.

Figure 7:
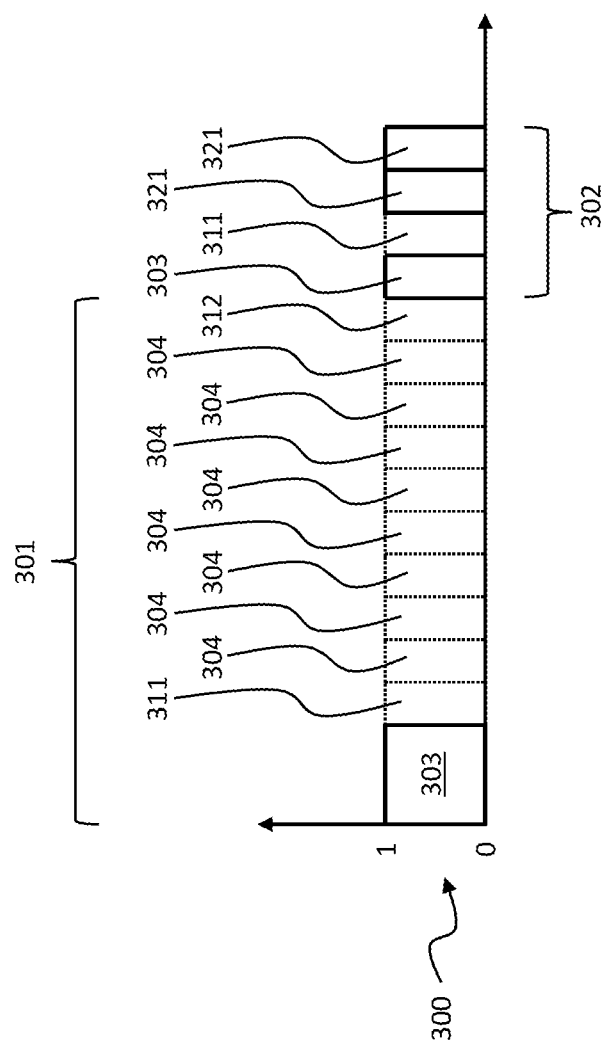
FIG. 7 shows a data signal.

FIG. 7 shows a data signal 300 that may be transmitted from the stationary unit 111 to the movable unit 103. The data signal 300 comprises a start sequence 301 and user data 302. The data signal 300 may correspond to the UART standard known from the prior art, in which a transmission channel is held at a logical 1 when no data transmission is currently taking place (idle 303). A start bit 311 is embodied as transmission of a logical 0 after idle 303. Subsequently, further zero bits 304 are transmitted until, according to the UART standard, a stop bit with a logical 1 would have to be transmitted again. However, this stop bit is replaced by an inverted stop bit 312, i.e. a logical 0 continues to be output. In this way, the start of a new data transmission may be signaled to a receiver, in this case the movable unit 103. After another idle 304 and another start bit 311, the transmission of user data 302 begins by transmitting user data bits 321. In FIG. 7, two user data bits 321 are shown in the user data 302, although transmission of more than two user data bits 321 is also possible, up to a plurality of bytes.

By transmitting the start bit 311 after idle 303, a defined start time for a transmission may be selected in each case. If the movable unit 103 receives a corresponding start bit 311 after idle 303, the movable unit 103 may be instructed to receive data. With the aid of the inverted stop bit 312, the start of the transmission of the user data 302 may be communicated to the movable unit 103.

Figure 8:
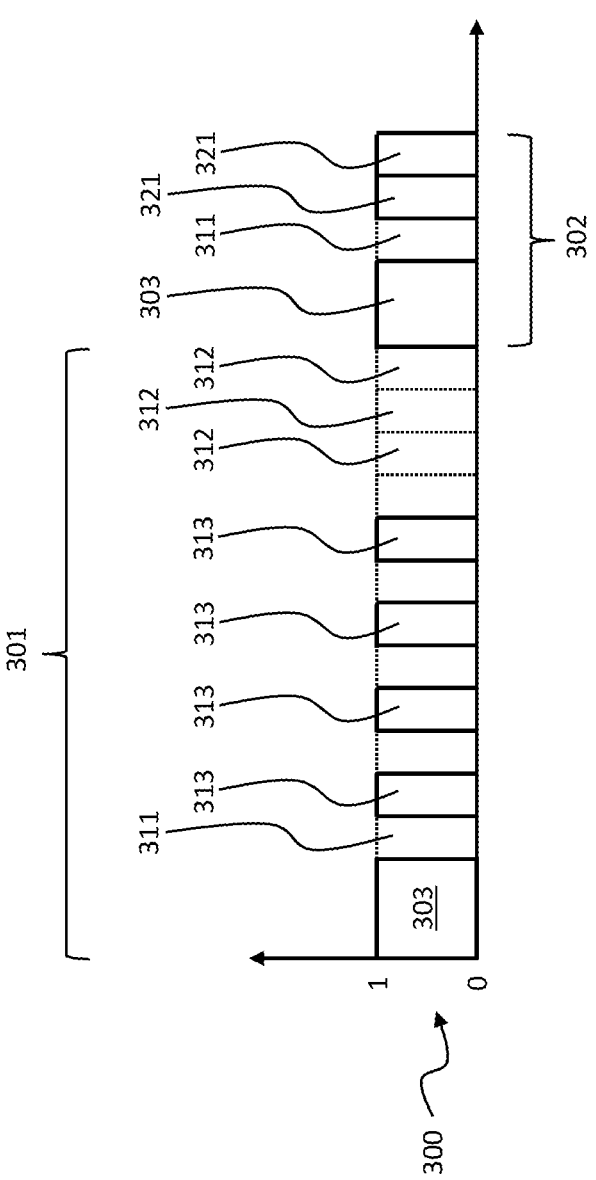
FIG. 8 shows a modified data signal.

FIG. 8 shows a modified data signal 300, which corresponds to the data signal of FIG. 7, unless differences are described below. Instead of multiple zero bits 304, a sequence with multiple switching edges 313 is transmitted. The switching edges 313 serve to allow the receiver of a data transmission to learn the frequency modulations of logical 1 and logical 0 with respect to a perceived carrier frequency and current circumstances, respectively. For example, depending on the position, its perceived amplitude of the carrier frequency varies and the switching edges 313 serve to adapt to the logic levels. Polarity detection is a consequence of this process. As a result, logical 0 and logical 1 may be better identified in the movable unit. In this regard, the switching edges 313 may be embodied such that the start sequence 301 comprises the decimal byte value 85. This is implemented by sending logical 1 and logical 0 alternately after the start bit 311 with a total of four times the value 1 and four times the value 0. Furthermore, the inverted stop bit 312 is present three times. The background to this approach is that the movable unit 103 may receive enough switching edges 313 to detect a polarity, i.e., which bits are transmitted with logic 0 and which are transmitted with logic 1. This is advantageous in a linear transport system 101 due to the possible movement of the movable unit 103 and the therefore necessary wireless transmission.

Figure 9:
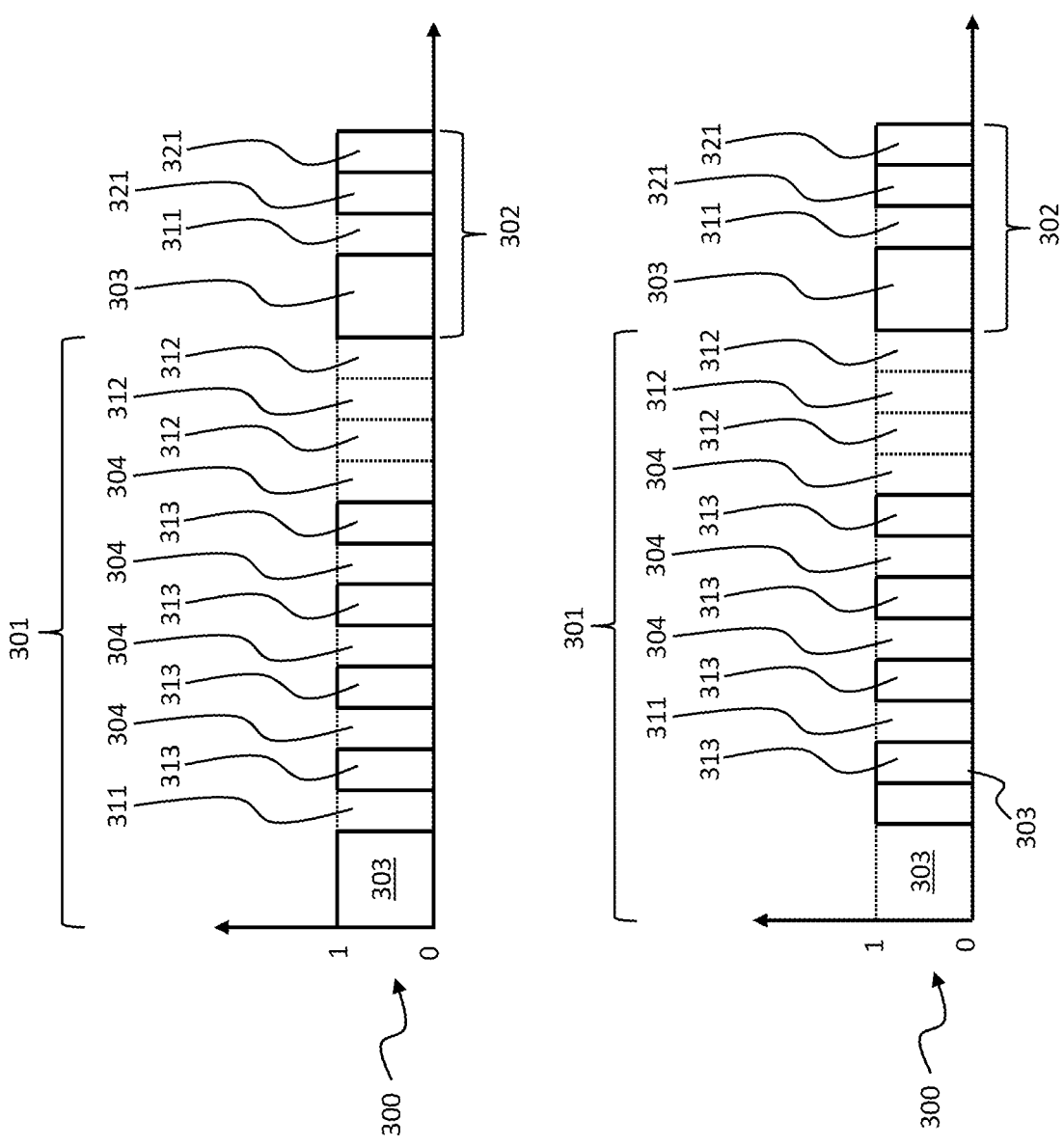
FIG. 9 shows a data signal received from the movable unit.

FIG. 9 shows the data signal 300 received by the movable unit 103. The upper representation of FIG. 9 corresponds to the case in which the polarity is correctly interpreted (i.e., as sent in FIG. 8). The lower representation of FIG. 9 corresponds to the case where the polarity is interpreted incorrectly. Here the first bit of the decimal byte value 85 is interpreted as idle 303. However, due to the subsequent switching edges 313, a detection of the polarity is possible. In this case, however, two of the three inverted stop bits 312 are not interpreted as such, but are perceived as normal bits, so that only the third inverted stop bit 312 is recognized and thus the identification of the start sequence 301 takes place.

Figure 10:
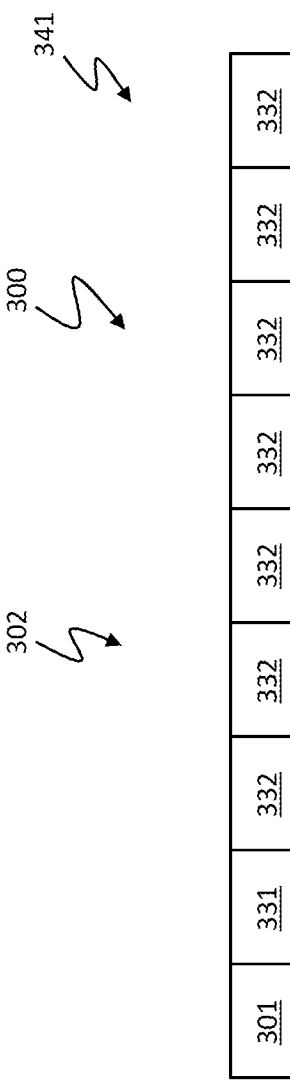
FIG. 10 shows a communication frame.

FIG. 10 shows a data signal 300 forming a first communication frame 341. The data signal 300 consists of the start sequence 301 described above and user data 302, with the user data 302 having a first byte 331 and a plurality of second bytes 332. Within the first byte 331, information about the communication is transmitted. The second bytes 332 are exclusively available for data transmission. In particular, the first byte 331 may contain information about a length of the first communication frame 341.

After the transmission of the start sequence 301 from the stationary unit 111 to the movable unit 103, the transmission of the user data 302 may be started. In the first byte 331, it is transmitted how many bits or bytes the transmission comprises, so that the movable unit 103 receives data until the number of bits or bytes is reached. For this purpose, the transmission of more than one first byte 331 may also be provided. In particular, it may be transmitted in the first byte 331 that a predetermined number of bytes is transmitted. Subsequently, the second bytes 332 are transmitted, wherein the number of second bytes 332 and the number of first bytes 331 (one in FIG. 10) together result in the predetermined number.

Figure 11:
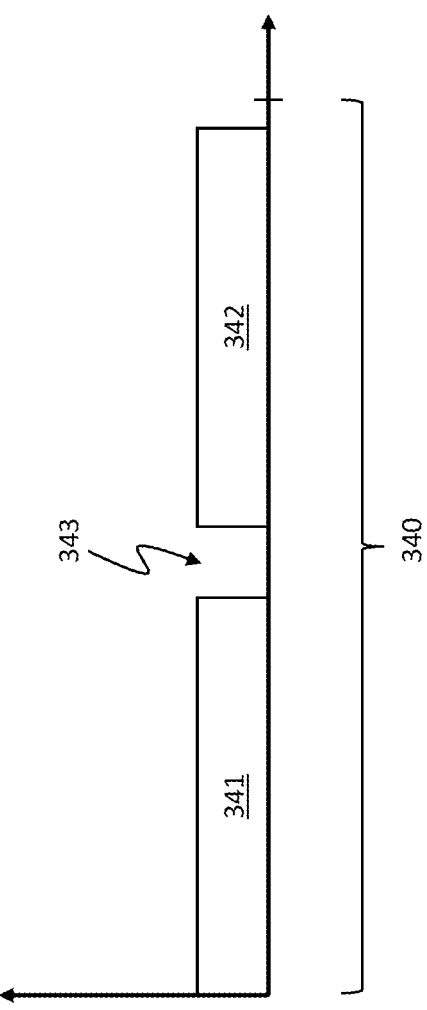
FIG. 11 shows a communication cycle.

FIG. 11 shows a communication cycle 340 comprising a first communication frame 341, which may correspond to the first communication frame 341 of FIG. 10, a second communication frame 342, and a switching pause 343. In the first communication frame 341, data is transmitted from the stationary unit 111 to the movable unit 103. The length of the transmission may be defined as described for FIG. 10. Also in the first byte 331 of FIG. 10, a length of a data transmission from the movable unit 103 to the stationary unit 111, that is, the second communication frame 342, may be specified. Thus, in the second communication frame 342, data is transmitted from the movable unit 103 to the stationary unit 111. A switching pause 343 is provided between the first communication frame 341 and the second communication frame 342. In the switching pause 343, the communication mode of the stationary antenna 129 of the stationary unit 111 is switched from transmitting to receiving, while the communication mode of the movable antenna 103 is switched from receiving to transmitting.

In an embodiment, a time length of the first communication frame 341 and the second communication frame 342 and the switching pause 343 is adapted to complete a full transmission within one control cycle. Furthermore, the transmission may be adapted to use the same stationary antenna 129 to receive the response at a maximum speed of the movable unit 103. In a further embodiment, the controller 133 is embodied to assign a response received on a different stationary unit 111 or a different stationary antenna 129 to the movable unit 103 accordingly.

It may be provided that the communication cycle 340 consisting of the first communication frame 341, the switching pause 343, and the second communication frame 342 lasts at most 250 microseconds. This allows for transmission at 4 kilohertz. Furthermore, this maximum duration of the communication cycle 340 may allow the movable antenna 131 of the movable unit 103 to not move away from the selected stationary antenna 129 of the stationary unit 111 during transmission, and allow complete transmission to occur using these two antennas. Alternatively, a transmission of data from the movable antenna 131 may be made to another stationary antenna 129.

Figure 12:
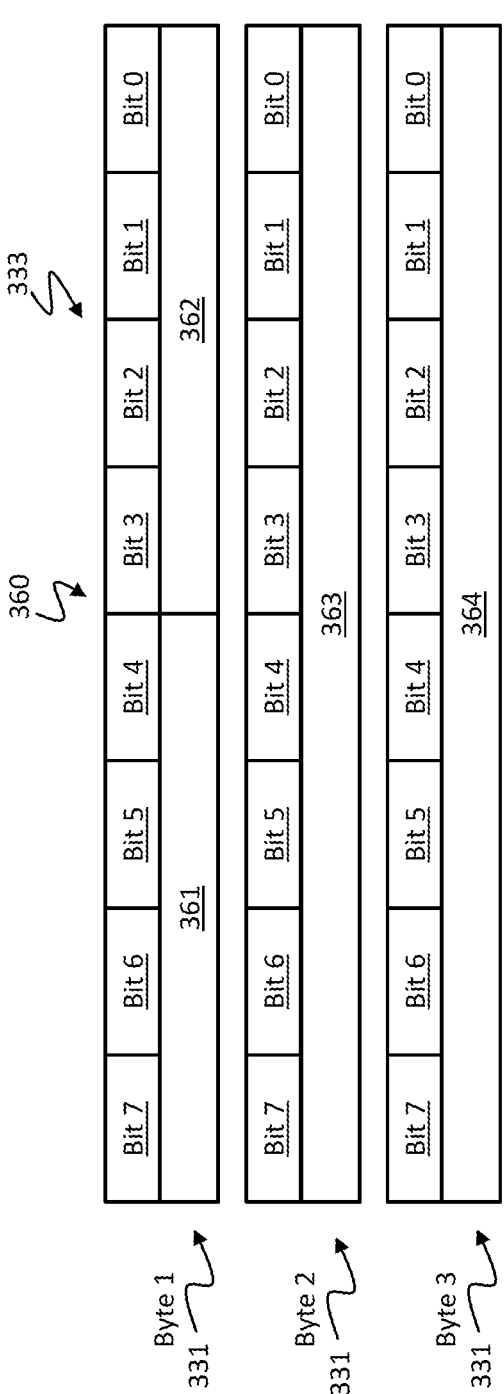
FIG. 12 shows first header data.

FIG. 12 shows three first bytes 331 that together form first header data 333. The first header data 333 is transmitted from the stationary unit 111 to the movable unit 103. The first header data 333 may be understood as a header 360 of the data transmission. The first header data 333 comprises a 4-bit address 361, a telegram type 362, communication control information 363, and a cyclic redundancy check 364. However, individual elements of the first header data 333 may be omitted, have different bit lengths, or have other elements not listed here. For example, the header 360 may comprise only the telegram type 362, wherein the telegram type 362 comprises the length of the first communication frame 341 and the second communication frame 342, respectively. The first header data 333 may thereby be transmitted within the first communication frame 341.

For each movable unit 103 of the linear transport system 101, e.g. a "long" address may be defined as a 2-byte object (max. 65536 movable units 103) and a "short" address may be defined in the header 360, wherein the short address is part of the 4-bit address 361. The "short" address must "only" be unique for all movable units 103 in the sphere of influence of a stationary unit 111 or a stationary antenna 129 of a stationary unit 111, and may e.g. comprise 1 the ower 3 bits of the "long" address. Here, it may be provided that if the first bit of the 4-bit address 361 is 1, all movable units 103 located in the sphere of influence of the stationary antenna 129 or stationary unit 111, respectively, are to be addressed. If the first bit of the 4-bit address 361 is 0, one of the movable units 103 may be addressed on the remaining three bits with the short address.

The telegram type 362 may e.g. be used to define which data is transferred and how many bytes it comprises. It may be specified via this whether it is cyclic data that is defined and configured beforehand. This also makes it possible to define with which data the movable unit 103 is to respond. Alternatively, it may be determined that it is an asynchronous transmission, in which the complete data transmission may be defined via a parameter ID with possible index and subindex in one or a plurality of transmissions. However, the telegram type 362 may also be used as a length indicator of the first communication frame 341 and the second communication frame 342, respectively.

The 4-bit address 361 and the telegram type 362 form one of the first bytes 331.

Based on the communication control information 363, which forms another of the first bytes 331, a communication between the stationary unit 111 and the movable unit 103 may be controlled or a status message may be indicated. For example, it may be indicated whether this is the start of a communication, or it is a continuous transfer (e.g. in the case of a long file transfer), or even whether a transfer has ended. It may be indicated whether a read or write access is to take place. Likewise, transmission errors may be indicated here or a communication status may be indicated or given here. The communication status may e.g. correspond to the EtherCAT states Init, Pre-Op, Safe-Op or OP.

The cyclic redundancy check 364 is used to secure the communication. In particular, the first byte 331 containing the cyclic redundancy check 364 may contain a check value of the first communication frame 341 that may be used to detect transmission errors.

Figure 13:
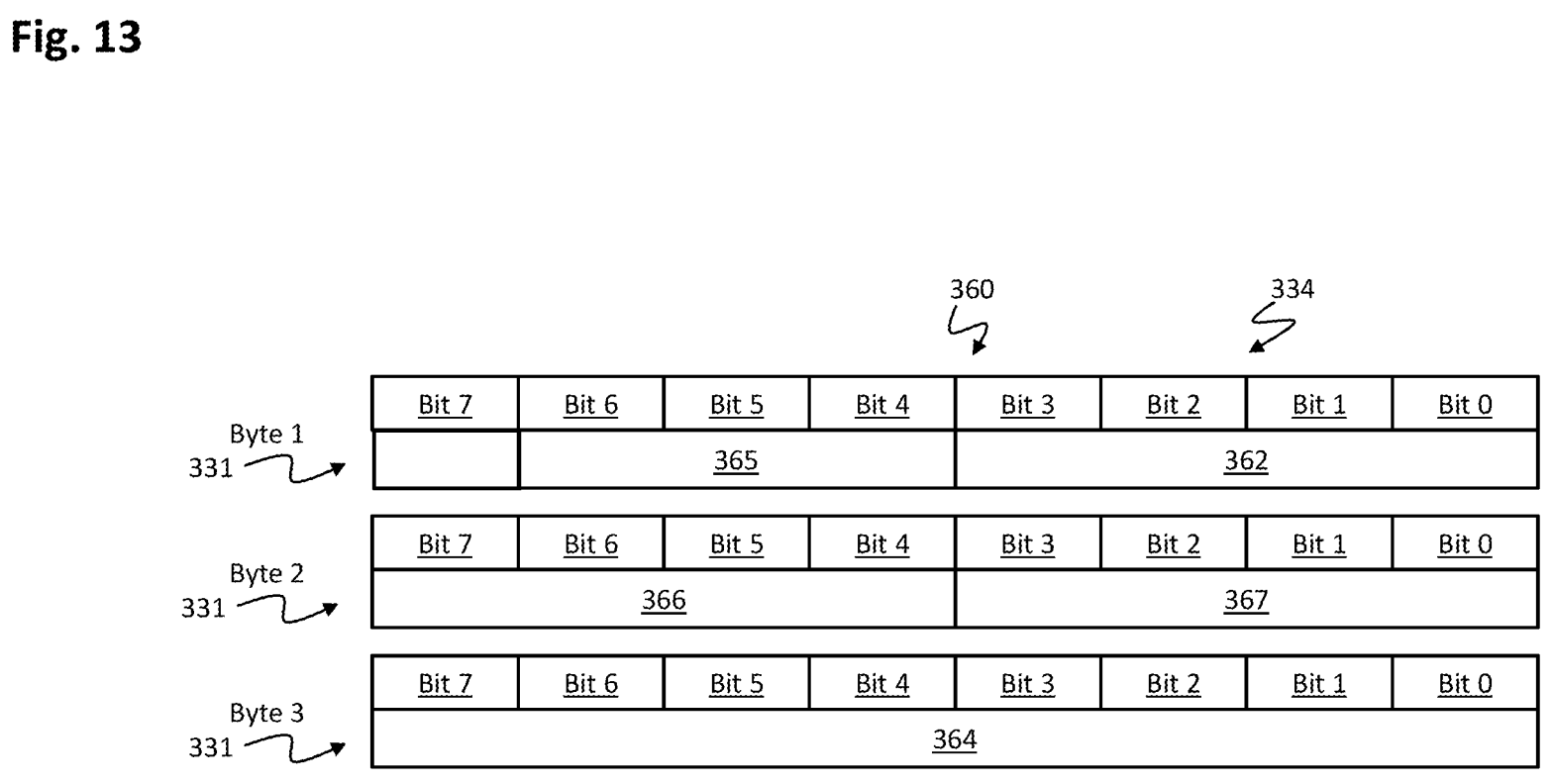

FIG. 13 shows three first bytes 331 that together form second header data 334. The second header data 334 are transmitted from the movable unit 103 to the stationary unit 111. The second header data 334 may be understood as header 360 of the data transmission from the movable unit 103 to the stationary unit 111. The second header data 334 comprise a 3-bit address 365, a telegram type 362, a communication status 366, a status information 367, and a cyclic redundancy check 364. However, individual elements of the second header data 334 may be omitted, have different bit lengths, or have other elements not listed here. For example, the header 360 may comprise only the telegram type 362, wherein the telegram type 362 comprises the length of the second communication frame 342. The second header data 334 may thereby be transmitted within the second communication frame 342.

The 3-bit address 365 may correspond to the "short" address of the movable unit 103. This may be used to transmit from which movable unit 103 within the range of the stationary antenna 129 the communication is received. The telegram type 362 may be configured analogously to FIG. 12.

It may be provided that the communication status 366, as shown in FIG. 13, requires less data volume than the communication control information 363. In this case, additional status information 367 may be provided within the first byte in which the communication status 366 is transmitted, wherein communication status 366 and status information 367 comprise a first byte 331. The status information 367 may comprise an application-specific actual value, such as a voltage. This may be used, for example, to control or regulate a transfer of energy to the movable unit 103 with the aid of the energy-transmitting coils 125. In addition to a specific voltage value, the status information 367 may also be embodied as a control by transmitting whether more or less or the same amount of energy is to be transmitted.

The cyclic redundancy check 364 corresponds to that of FIG. 12.

The user data 302 may include a timestamp, e.g. within one of the first bytes 331 or within the second bytes 332. This time stamp may e.g. include a system time at the time of the start bit 311. A clock on the movable unit 103 may then be synchronized based on the time of receipt of the start bit 311 and the time stamp. This may e.g. transmit a triggering command for the tool 137 that includes to carry out an action of the tool 137 at a particular time. The start sequence 301 of the communication from the stationary unit 111 to the movable unit 103 may be carried out in a fixed grid of a cycle time and may be used to adjust or synchronize the clock on the movable unit 103, e.g. with a PLL (Phase Locked Loop). By transmitting a system-wide valid time and this synchronization, all clocks on all movable units 103 may be set very exactly the same.

Figure 14:
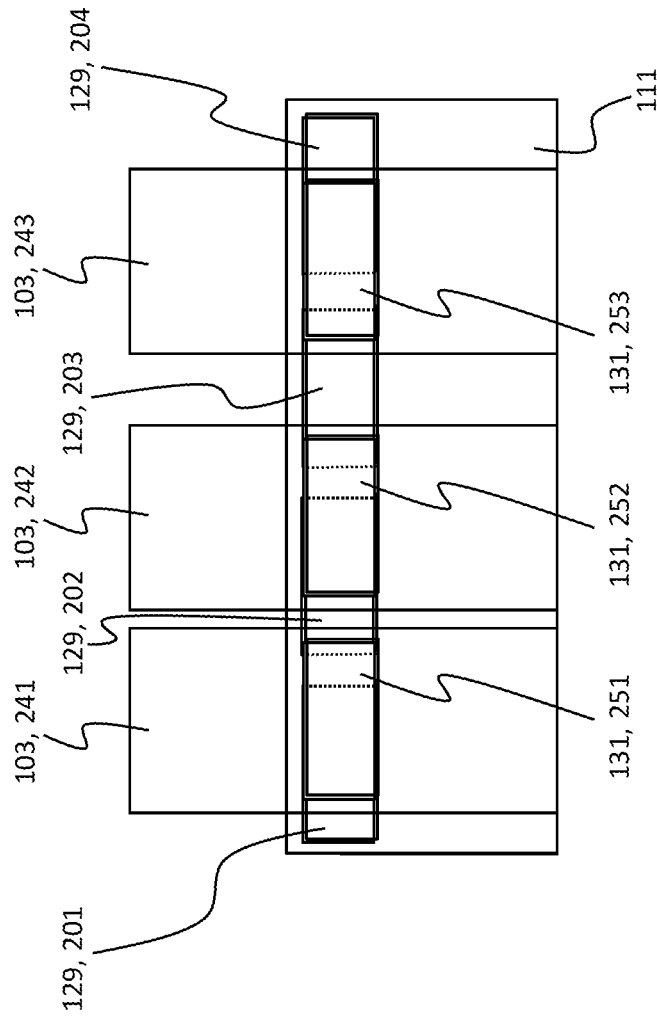
FIG. 14 shows a schematic view of a stationary unit with a plurality of movable units.

FIG. 14 shows a schematic view of a stationary unit 111 with a plurality of movable units 103. The stationary unit 111 again comprises four stationary antennas 129, a first stationary antenna 201, a second stationary antenna 202, a third stationary antenna 203, and a fourth stationary antenna 204. A first movable unit 241 comprises a first movable antenna 251. The first movable unit 241 is in this context arranged in the area of the first stationary antenna 201. The second movable unit 242 is in this context arranged in the area of the second stationary antenna 202. The third movable unit 243 is in this context arranged in the area of the fourth stationary antenna 204. Depending on whether communication is to take place with the first movable unit 241, the second movable unit 242 or the third movable unit 243, identification information may thus be used to select the first stationary antenna 201, the second stationary antenna 202 or the fourth stationary antenna 204. Nevertheless, if crosstalk is an issue, e.g. from the first stationary antenna 201 to the second movable antenna 252 of the second movable unit 242, the 4-bit address 361 explained in connection with FIG. 12 may be used to achieve a unique allocation of the communication. For pairs of antennas for which it is known that there can be no crosstalk, such as the first stationary antenna 201 with the first movable antenna 251 and the fourth stationary antenna 204 with the third movable antenna 253, simultaneous communication may take place, as well. In particular, parallel communication from different stationary units 111 to different movable units 103 may also be provided.

With reference to FIG. 14, a method for initializing a linear transport system 101 is further described. The linear transport system 101 may be embodied as described in the previous figures. The following steps are carried out by the controller 133. First, position data of the movable antenna 131 of the movable unit 103 to be initialized is determined. Then, at least a stationary antenna 129 of one of the stationary units 111 within the transport system 101 is selected based on the position data of the movable antenna 131. Then, a data packet is output to the stationary unit 111, the data packet comprising an initialization sequence. Now, a unique allocation address of the movable unit 103 is determined.

This method makes it possible to address the movable units 103 using the unique allocation addresses and thereby to control a communication or determine which of the movable units 103 should be the recipient of a telegram.

In an embodiment, the second movable unit 242 in FIG. 14 is to be initialized. The initialization sequence comprises a ticket number. Two stationary antennas 129 are selected, and the second movable antenna 252 of the second movable unit 242 is arranged within the area of influence of the two selected stationary antennas 129. The second movable antenna 252 overlaps with the second stationary antenna 202 and the third stationary antenna 203. The data packet comprises control information in such a way that the ticket number is to be output by the second stationary antenna 202 and the third stationary antenna 203 at least once at different points in time.

The second stationary antenna 202 and the third stationary antenna 203 are thereby arranged on different spatial sides of the second movable unit 242. The first movable unit 241 is located only in the area of influence of the second stationary antenna 202 while the third movable unit 243 is located only in the area of influence of the third stationary antenna 203. Both the first movable unit 241 and the third movable unit 243 represent additional movable units 103 that are not currently to be initialized, and are located within the area of influence of one of the selected stationary antennas 129. However, since only the second movable unit 242 to be initialized is arranged in the area of influence of both selected antennas 129, i.e., the second stationary antenna 202 and the third stationary antenna 203, the second movable unit 242 may determine from the number of ticket numbers received that exactly the second movable unit 242 is currently to be initialized. This may e.g. be done by incrementing a counter in the corresponding movable unit 103 by one each time a ticket number initialization sequence is received, comparing the counter to a predetermined value, and outputting a unique allocation address if the counter exceeds the predetermined value. In this case, the unique allocation address may be an identification number already allocated during production of the movable unit 103. In this case, the first movable unit 241 receives only the ticket numbers issued by the second stationary antenna 202, and the third movable unit 243 receives only the ticket numbers issued by the third stationary antenna 203. Only the second movable unit 242 receives both the ticket numbers output by the second stationary antenna 202 and the ticket numbers output by the third stationary antenna 203. Thus, the counter of the second movable unit 242 increases faster than the counters of the first movable unit 241 and the third movable unit 243, respectively. Thus, the counter of the second movable unit 242 reaches the predetermined value faster. In particular, the predetermined value may be larger than the number of times the ticket number is transmitted by the second antenna 202 and less than twice the number of times the ticket number is transmitted by the second antenna 202. This allows the second movable unit 242 to be uniquely allocated.

It may be provided that the ticket number is output multiple times by the second stationary antenna 202 and the third stationary antenna 203. This may reduce effects of transmission errors if, for example, each of the selected stationary antennas transmits the ticket number four times and the predetermined value to which the counter is compared is six. The second movable unit 242 to be initialized then only needs to correctly receive six out of eight transmissions of the ticket number. However, the first movable unit 241 and the third movable unit 243, respectively, which are within the range of influence of only one of the selected stationary antennas 129, will receive only four transmissions of the ticket number even in the absence of a transmission error, so that the counter for first movable unit 241 and third movable unit 243, respectively, remains below the predetermined value.

If the specified value is not reached by the counter, i.e. as for the first movable unit 241 and the third movable unit 243, and if one of these is now to be initialized, a further ticket number different from the previous ticket number is used. After receiving the further ticket number, the counter is restarted and incremented as described. In this way, a unique allocation may be achieved. This method may be used in particular during operation, if an additional positioning of the movable units 103 for initialization should not take place.

It may further be provided that other stationary antennas 129, e.g. the first stationary antenna 201 and the fourth stationary antenna 204, are additionally used.

Figure 15:
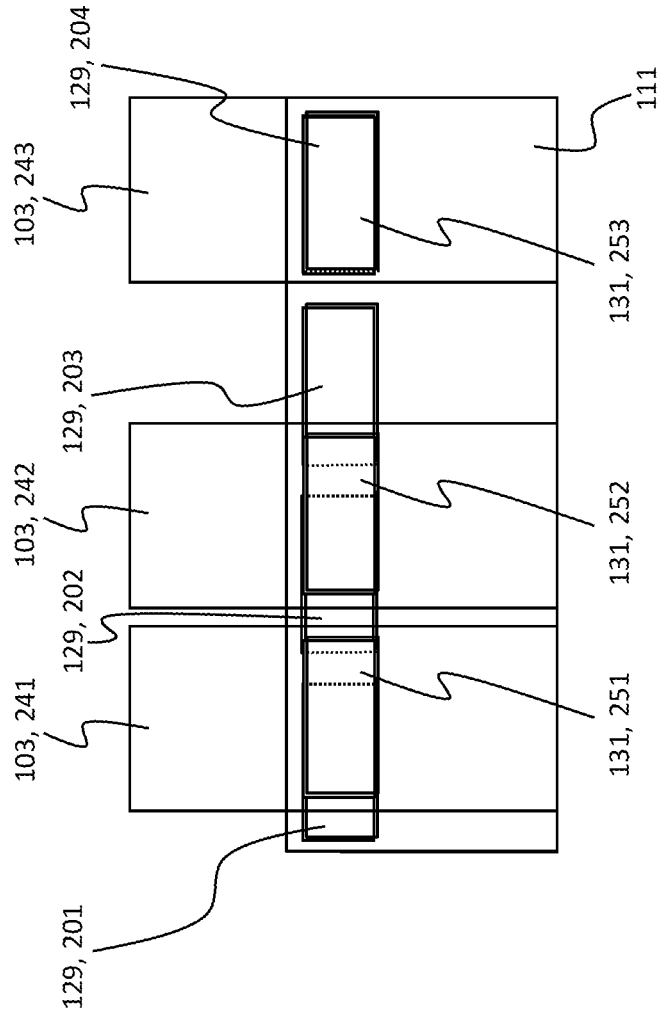
FIG. 15 shows another schematic view of a stationary unit with multiple movable units.

FIG. 15 shows the stationary units 111 and movable units 103 of FIG. 14, with the third movable unit 243 having been moved. This is done as part of another method for initializing a linear transport system 101, in which control commands for a drive of the linear transport system 101 are also issued. Based on the control commands, a drive of the transport system is controlled in such a way that the third movable antenna 253 of the third movable unit 243 to be initialized is moved into the area of influence of the fourth stationary antenna 204. The second movable unit 242 and also the first movable unit 241 are then not within the range of influence of the fourth stationary antenna 204, so that a transmission from the fourth stationary antenna 204 to the third movable antenna 253 and thus the third movable unit 243 may be used to initialize the third movable unit 243. Additionally, provision may be made to move the second movable unit 242 and also the first movable unit 241 away from the fourth stationary antenna 204.

This allows for improving the selection of the stationary antennas 129 and further also to initialize the movable unit 103 using only one stationary antenna 129. In this case, the movable unit 103 to be initialized, in this case the third movable unit 243, may be brought into the area of influence of the fourth stationary antenna 204 and all other movable units 103, in this case the first movable unit 241 and the second movable unit 242, may be brought to positions outside the area of influence of the fourth stationary antenna 204.

In an embodiment of the method for initializing a linear transport system as described with reference to FIGS. 14 and 15, the setting of the unique allocation address of the movable unit 103 is carried out in such a way that a character string transmitted from the movable unit 103 to be initialized via the movable antenna 131 is stored as the unique allocation address. This character string may be a character string already allocated during production of the movable unit 103.

In an embodiment of the method for initializing a linear transport system as described with reference to FIGS. 14 and 15, a 3-bit address is then output to the stationary unit 111, wherein the 3-bit address is to be transmitted to the movable unit 103. This 3-bit address may correspond to the previously described 3-bit address 365 in the first header data 333 of FIGS. 12 and 13. The movable unit 103 may be arranged to receive the 3-bit address.

In an embodiment of the method for initializing a linear transport system as described with reference to FIGS. 14 and 15, the setting of the unique allocation address is carried out such that a character string and a 3-bit address are determined by the controller 133 and output to the stationary unit 111. The character string and the 3-bit address are to be transmitted to the movable unit 103. Thus, a character string may be determined for the movable unit 103 if no character string has been allocated during production of the movable unit 103. Furthermore, this method may be used to replace a character string allocated during production of the movable unit 103.

In an embodiment of the method for initializing a linear transport system as described with reference to FIGS. 14 and 15, the method is repeated for another movable unit 103. In particular, the procedure is repeated for all movable units 103.

Figure 16:
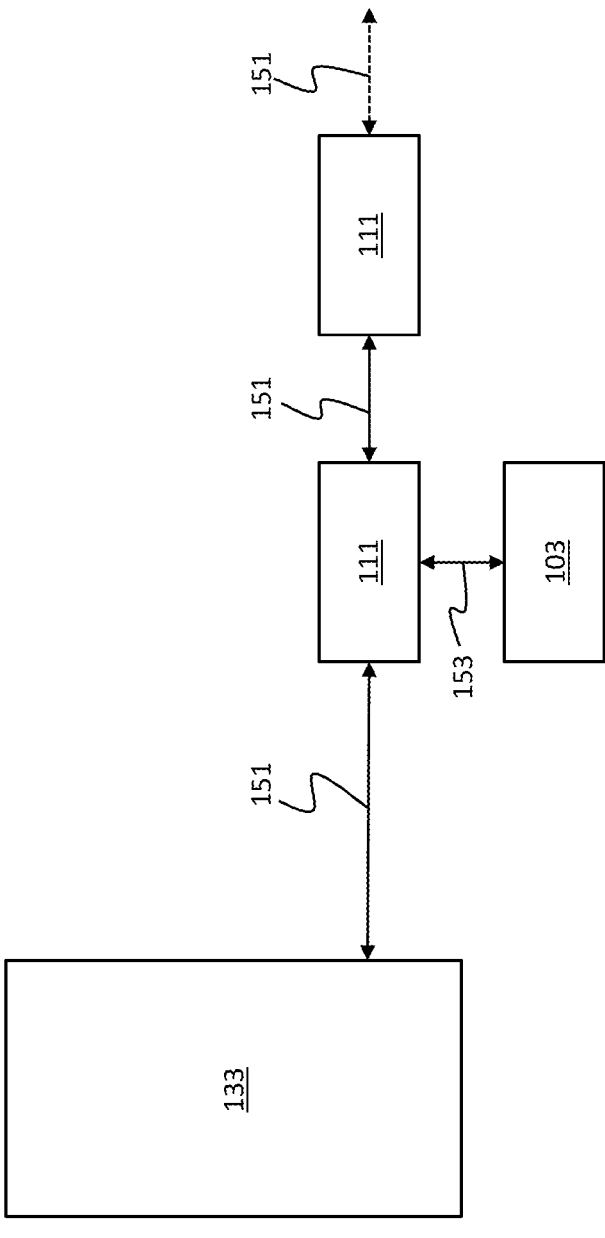
FIG. 16 shows a schematic diagram of the communication between controller, stationary units and a movable unit.

FIG. 16 shows a schematic overview of a communication between a controller 133, stationary units 111 and a movable unit 103. The stationary units 111 and the movable unit 103 may be embodied as described above. With the aid of a communication link 151, the controller 133 is connected to one of the stationary units 111, which in turn is connected to another of the stationary units 111. The communication link 151 may be an EtherCAT connection. Other communication subscribers in FIG. 16, such as motor boards, sensor boards and bus couplers, may also be connected to the communication link 151. With the aid of wireless data communication 153, one of the stationary units 111 is connected to the movable unit 103, wherein with the aid of the wireless data communication 153 the above-described data transmission between one of the stationary antennas 129 and the movable antenna 131 may be carried out.

By the communication links 151, the stationary units 111 may be synchronized with a central clock. Wireless data communication 153 may also be used to synchronize the movable unit 103 with the central clock. A clock of the movable unit may be synchronized to and synchronized with the central clock of the linear transport system 101 with the aid of synchronous communication and/or by using the time stamp (clock) described above. In doing so, a PLL (Phase Locked Loop) on the movable unit 103 may be used to readjust a real time on the movable unit 103 and thus avoid deviations from the central clock. Synchronization may also be achieved in this way over longer periods of time, even if sections without communication capability between stationary unit 111 and movable unit 103 are provided in the linear transport system 101. A remaining drift of the clock of the movable unit 103 is within the range of the rate inaccuracy of various timers. For example, quartz oscillators with a typical rate inaccuracy of +/−10 ppm to 100 ppm may be used. This means that over a 10 second period, there may be a variation of twice 1 ms to twice 0.1 ms. After receiving the start sequence, which marks the beginning of a new transmission to the movable unit 103, the movable unit 103 may execute its PLL when the start sequences are transmitted at specified times.

Using the time synchronization, actions of a tool 137 on the movable unit 103 may be executed to match a machine cycle or a specific position of the movable unit 103, e.g. gripping a product that has been detected by another component such as a photoelectric sensor. Certain actions on the movable unit 103 may be transmitted with a time stamp for the setpoint to be executed appropriately.

This makes it e.g. possible, even if the transmission of a complex action setpoint requires a longer time or a plurality of communication cycles, to still precisely define the future time of the action system-wide. In this way, actions may be executed at a later point in time. Actions may thus also be scheduled and subsequently executed for sections of the route within the linear transport system where no radio link 153 to the movable unit 103 exists. Thus, even with only one or a few stationary units 111 that comprise a stationary antenna 129, time-synchronous actions may be controlled and executed over a much longer distance. A prerequisite may be a suitable energy storage on the movable unit 103 to ensure the later action. Alternatively, energy may be transmitted with the aid of an energy-transmitting coil 125 at the location relevant to the action. Thus, it is possible to use cost-optimized stationary units 111, with some stationary units 111 having energy-transmitting coils 125 and stationary antennas 129 and other stationary units 111 having only energy-transmitting coils 125. A subsequent time and position synchronous action may thus be prepared by a stationary module 111 with energy transmit coils 125 and stationary antennas 129.

Furthermore, the linear transport system 101 may become more robust against communication disturbances by using time stamps. By transmitting data early with a timestamp, the data signal 300 may be repeated a few more times before the actual action time is reached. Further, a longer communication may be made to multiple movable units 103 in succession, while still allowing the action to occur on those multiple movable units 103 simultaneously. Similarly, a system-wide timestamp may be provided to a particular event on the movable unit 103 when this event occurs, e.g. a measured value. This results in further advantages in further processing.

Via time synchronization, even a larger amount of data to be exchanged between a movable unit 103 and the controller 133 of the linear transport system 101 may be transmitted across multiple communication cycles 340 and stationary units 111 as the movable unit 103 moves across the various stationary units 111. In the movable unit 103 or in the controller 133 (depending on the direction of transmission), the data may still be properly assembled.

If the above-described addressing with the aid of the 4-bit address 361 is provided, time synchronization of a plurality of movable units may be achieved by receiving the start sequence 301 by a plurality of movable units 103, even if the actual user data 302 of the communication is intended for only one particular movable unit 103.

The linear transport system 101 may e.g. be applied in automation engineering. The tool 137 arranged on the movable unit 103 may e.g. comprise a gripper, a pusher, a drill, an alignment device, a mechanical or magnetic coupling of a plurality of movable units 103, a measuring tool for measuring a physical quantity, such as temperature, pressure, current, voltage, acceleration, mass, light incidence. Furthermore, the tool 137 may comprise a read head that may be used to read an encoder tape, thereby allowing for further determining a position. This further more accurate position may then also be used to improve control of the movable unit 103 and/or control of the linear motor 107. This principle may of course also be used with other physical quantities measured on the movable unit 103, e.g. accelerations or vibrations. Furthermore, physical quantities may be generated on the movable unit 103 with the aid of the tool 137. A force could be generated via a movement of the tool 137 of the movable unit 103, and with an adjustable current limit of the drive coil used, the force could also be controlled or set. Furthermore, a vacuum could be generated. This would allow products to be picked up and released via a special suction cup in a manner that is particularly gentle on the product itself. Test voltages could be generated. Using such test voltages, it would also be possible to functionally test products consisting of complex electronic circuits.

Communication to a more complex product with a communication interface would also be possible. Other physical quantities for material testing may also be generated, e.g. ultrasound, or currents, or light. Additionally, communication may be established to a workpiece transported by the movable unit 103, and thus testing or other production monitoring may take place, e.g. seamless product tracking, if this data is linked to further data in the controller 133 and e.g. written to a database. Advantageously, data may thus be written to or read from a workpiece.

Furthermore, a heater could be provided to generate a higher temperature in a targeted manner and limited to a small area in order to e.g. dry an adhesive or paint faster and more energy-efficiently during a process. In this context, it may be provided a workpiece or a product on the movable unit 103 at a specific temperature, e.g. in order to be able to process the workpiece or product for a longer time. With a switchable magnetic field source (coil), magnetic parts may be easily fastened, transported and set down again. Furthermore, the movable unit 103 may comprise a camera or other sensors to inspect the linear transport system 101 for wear, dirt, or otherwise. This is particularly useful when the linear transport system 101 has locations that are difficult or impossible to access.

Movements of any kind may be carried out on the movable unit 103, e.g. also transverse to the direction of travel defined by the guide rail 105. A gripper may grip products and release them again without the need for a mechanical link with springs. It may be provided, depending on the status of the product, that it is deposited on a different belt and thus sort it out, for example. The tool 137 may comprise a pusher to selectively push products from a movable unit 103 onto a belt, for example. Via the pusher or a similarly movable element on the movable unit 103, a product flow that is handled by a linear transport system 101 may be distributed to various further transports, such as belts. Thus, with only one linear transport system 101 without a switch (with which the movable units 103 could be guided in different directions), it is possible to divide a fast product flow as required and also to bring it together again in the opposite direction.

Movements may be carried out by the tool 137 by which the product may be manipulated, e.g. to erect a carton or to process products. Drills may be used or pressure may be applied to the product with the aid of a press. Furthermore, a rotary motion may be carried out to change an orientation of products from longitudinal to transverse, e.g. by rotating a workpiece holder. Products may be lifted. Products may be rotated and thus e.g. a lid of a bottle may be screwed down. Products may also be changed with regard to their distance from each other. An actuator on the movable unit 103 may be used to move a product so that product misalignments on an empty movable unit 103 may be compensated for. Thus, in a row of movable units 103 with a product defect in the row, the products on the units to the left of it may be moved half the distance to the right and vice versa on the other side, so that the products may be removed from a following machine unit for further processing without a defect in between with an equal distance to each other.

Products such as bottles may be precisely aligned if e.g. a label, printing or other component such as a drinking straw is to be applied to a bottle. Movements may be superimposed. Various hardware may be integrated into the tool 137 of the movable unit 103, and may be controlled via setpoints, e.g. also via PWM signals (solenoid valves, DC motor, stepper, small servo, VoiceCoil motor, vibration elements, electromagnets, vacuum, laser, ultrasonic source). Via HW limit switches or travels against a stop, absolute positioning may also be achieved without feedback, e.g. with a DC motor. Products could be measured via grippers or other mechanics and a measurement of the current consumption in the movement (in addition, a condition monitoring of components of the movable unit 103 as well as product components becomes possible). Products may be sorted and e.g. transferred between movable units 103 and storage stations.

Movable units 103 may be coupled and uncoupled as needed to increase driving force, e.g. by hooking a mechanical moving part of one movable unit 103 into the other movable unit 103 or with the aid of an electromagnetic coupling. When synchronized with products moving on a belt, space may be saved between the movable units 103 if the tool 137 may be moved perpendicularly with regard to the direction of travel specified by the guide rail 105. This allows for the tool 137 to enter narrower product gaps and cope with smaller gaps, thereby increasing a machine output. Movable units 103 jointly transporting a product may form a mechanical safety coupling during transport, which even in the event of a fault (power failure, etc.) ensures that the sensitive product is held and cannot fall off or the product itself is destroyed, e.g. by the movable units spinning out differently. This is possible both when both movable units 103 are part of the same linear transport system 101 and when both movable units 103 are part of different linear transport systems 101.

An electrically operated tool change on the movable unit 103 is possible, as well. Tools/receptacles/holders may be intelligently adjusted to a dimension of the product.

If the method described above is used to synchronize the movable unit 103 with the aid of time stamps, movements of the tool 137 may be started in a time-controlled manner, even at points where no data may be transmitted. Furthermore, movements may be started synchronously with a position of the movable unit 103 and external processes, or may be precisely synchronized thereon. In particular, a delay time of the entire data transmission from the controller 133 to the tool 137 may be known exactly and, due to a complete synchronization of all elements, it may also have very little jitter, e.g. in the range of the gait inaccuracy or the PLL accuracies. Another advantage is that both the application of the automation technology and the data communication to the tool 137 may be calculated and processed in the controller 133, resulting in short reaction times. Furthermore, products may be introduced into and retrieved from a process outside of the linear transport system 101 in a time-controlled manner, e.g. in burner stations or baths.

With the aid of data transmission, any physical quantities may also be measured on the movable unit 103 if the tool comprises a suitable sensor system. After analog-to-digital conversion, measured values may be transmitted to the stationary unit 111 and also to the controller 133. In this way, a higher process reliability may be achieved, in particular when the output of a machine is high. Furthermore, this allows for manufacturing of single pieces or small series. A temperature may be monitored and also a process statement about it would be possible (for example in cold chain monitoring). A pressure may be measured and monitored. An electrical test of a board may be carried out on the movable unit 103, e.g. comparable to an ICT test. In such a test, it would also be possible to communicate with the tool 137 using a specific communication protocol and exchange test data or test complicated timing sequences. A charging process (both current and voltage) of a component such as an accumulator on the movable unit 103 may be measured. Signals received from the movable unit 103 may also act in a closed-loop control manner on the motion input of the movable unit 103. Here, e.g. a direct motion control regulation would be conceivable, in which an actual acceleration of the movable unit 103 or possibly only at a certain point of the movable unit 103 is detected via an acceleration sensor and this is used in the regulation in a suitable observer structure (e.g. in the case of larger/longer tools or products that tend to vibrate or the like). Other sensors such as vibration sensors could also be used as feedback. A temperature measured on the movable unit 103 could be used in the control, e.g. to compensate for thermal expansion.

Products may be weighed and e.g. a filling process may be controlled via this. Light and/or induction sensors may be provided in the tool 137 for product detection. Direct electrical contact may also be provided, and via this contact a data communication between the tool 137 and/or product and the second microcontroller 223 of the movable unit 103. However, between the second microcontroller 223 and the tool 137 there may be one (a plurality of) further microcontroller(s), e.g. to control the application on the movable unit 103. Further accurate position measurement in addition or as an alternative to position measurement using position detection element 143 and position sensor 145 would be possible. With a read head on the movable unit 103 and an encoder tape along the stationary units 111, e.g. an overall more cost-effective position determination could be possible, in particular for a linear transport system 101 with a large number of stationary units 111 and few movable units 103. The position data determined in such a way could then be used in parallel or alternatively in the control of the drive coils. Thus, it would be convenient to measure a position of the movable unit 103 and even of a plurality of movable units 103 simultaneously over a longer distance. With the aid of a signal strength of the transmission, a dimension of an air gap may also be determined and observed. Likewise, condition monitoring of both the movable unit 103 and product components is possible, e.g. using acceleration and/or vibration sensors installed on the movable unit 103.

An address of the movable unit 103 may be read, thereby allowing for identifying the movable units 103, particularly in large branched systems in which movable units 103 may be freely moved between freely movable sections. In this regard, the address may be transmitted to the movable unit 103 in an initialization routine, e.g. when only one movable unit 103 is within range of a stationary antenna 129 and this is done with the aid of the transmission of a 1 in the first bit of the 4-bit address 361 described above. Further, an identification number of the tool 137 and/or an identification number of a product ID located on the movable unit 103 may be read and/or written (including with the aid of a QR/BAR code). This may e.g. be done via direct wired communication between the product and the movable unit 103. An RFID reader as a tool 137 with communication to an RFID transponder in the product is also possible. This may simplify the production of single pieces or small series. In addition to the identification number, the state of the movable unit 103 and/or the tool 137 may also be stored in a memory on the movable unit 103, e.g. a previous operational performance or maintenance information. A movable unit 103 including a tool 137 from a reserve storage may also have such information stored in a memory, as it may differ from the overall performance of the linear transport system 101. Mechanical tolerances of the movable unit 103 including those of the tool 137, such as a position offset of a mechanical edge to the feedback flag, may be determined and stored during a separate operation via the movable unit 103. Other parameters that allow for better control behavior of the movable unit 103 may also be transferred, such as a weight of a movable unit 103 including the tool 137 or an exact strength of the magnets 117. This, together with the identification number of the tool 137, an identification number of a product, etc., could also be done dynamically (e.g. during a product loading or unloading operation) and change in the process.

Furthermore, a cogging table specific to a movable unit 103 may be stored on the movable unit 103 and queried by the controller 133 to compensate for a cogging force ripple in a closed-loop control. In the case of a position evaluation via magnets 117 of the movable unit 103 (Hall evaluation), both magnet tolerances and correction values may be stored on the movable unit 103 in order to later perform a compensation calculation with the aid of the controller 133. In the case of an optical inspection, the result may be transmitted, wherein with the typically high data rate that would be required for a fast cyclic transmission, this may also be carried out via another communication, e.g. via WLAN, wherein, however, a synchronization of the data of the optical inspection to the movement process would be possible quickly and unambiguously via quickly transmitted time stamps or similar.

Other communication to e.g. mobile terminals (cell phone and/or PDA) via NFC or wireless may also reach the movable unit 103 via this or be synchronized to the process (communication with external controllers, processes). In this context, the possibility of external communication may e.g. be switched on or off via the controller 133, or passed on with the aid of the controller 133. In addition, the movable unit 103 may have stored on it an instruction that has been previously transmitted and that includes work instructions and/or a recipe, so to speak, for the product. This may then be used to communicate to other controllers how the product should be processed (e.g. in processing and measuring stations). Results from this could be stored directly. Also, values may be transferred from an external process, e.g. in a processing station, to the movable unit 103, which are then in turn available to the controller 133 via the data transfer to the stationary unit 111. Values and states of a product and/or the movable unit 103 may also be displayed directly on the movable unit by LEDs or small displays. Furthermore, it is possible to store process data of a product in a database.

Furthermore, control of a print head in digital printing arranged on the movable unit 103 is possible. Furthermore, with the aid of a memory capacity provided on the movable unit 103, the complete state including the movable units 103 and the products arranged on the movable units 103 may be read out after a restart of the linear transport system 101. As a result, it is possible to start the linear transport system 101 in a targeted manner, thereby minimizing waste.

All of the above applications may require both data transfer according to the invention and power transfer between stationary unit 111 and movable unit 103.

Enumerated Examplary Embodiments

1. A method for transferring data between a movable unit (103) and a stationary unit (111) of a linear transport system (101), wherein the linear transport system (101) comprises a guide rail (105) for guiding the movable unit (103), a plurality of stationary units (111), a controller (133), and a linear motor (107) for driving the movable unit (103) along the guide rail (105), wherein the linear motor (107) comprises a stator (109) and a rotor (113), wherein the stator (109) comprises the stationary units (111), each comprising one or a plurality of drive coils, wherein the rotor (113) is arranged at the movable unit (103) and comprises one or a plurality of magnets (117), wherein the stationary units (111) each comprise at least a stationary antenna (129), wherein the movable unit (103) comprises a movable antenna (131), wherein the following steps are carried out by the controller (133):

determining position data of the movable antenna (129) of the movable unit (103);

selecting a stationary antenna (129) within the linear transport system (101) based on the position data of the movable antenna (131);

outputting a data packet to the stationary unit (111), wherein the data packet comprises a control signal, the control signal including identification information by which the selected stationary antenna (129) may be identified, wherein the data packet comprises a data signal (300) to be transmitted via the selected stationary antenna (129), wherein the data signal (300) comprises a start sequence (301), the start sequence (301) being arranged to trigger a data receipt of the movable unit (103), wherein the data signal (300) comprises a first communication frame (341) following the start sequence (301), the first communication frame (341) comprising a start bit (311) and user data (302) to be transmitted.

2. The method of embodiment 1, wherein the start sequence (301) comprises a plurality of switching edges (313) and at least three inverted stop bits (312).

3. The method of embodiment 2, wherein the start sequence (301) comprises the decimal byte value 85.

4. The method of any one of embodiments 1 to 3, wherein the first communication frame (341) comprises first header data (333), the first header data (333) including information about a telegram type (362), wherein the first communication frame (341) is set based on the telegram type (362).

5. The method of embodiment 4, wherein the telegram type (362) comprises receipt information of a second communication frame (342).

6. The method of embodiment 5, wherein the telegram type (362) comprises length information of the first communication frame (341), and wherein the receipt information comprises length information of the second communication frame (342).

7. The method of embodiment 5 or 6, wherein a communication cycle (340) consisting of the first communication frame (341), a switching pause (343), and the second communication frame (342) is 250 microseconds or less.

8. The method of any one of embodiments 4 to 7, wherein the telegram type (362) comprises information on a type of user data (302) to be transmitted.

9. The method of any one of embodiments 4 to 8, wherein the first header data (333) comprise an address of the movable unit (103).

10. The method of any one of embodiments 4 to 9, wherein the first header data (333) include communication control information (363).

11. The method of any one of embodiments 4 to 10, wherein the first header data (333) comprise values for performing a cyclic redundancy check (364).

12. The method of any one of embodiments 1 to 11, wherein the first communication frame (341) comprises a timestamp.

13. The method of any one of embodiments 1 to 12, wherein a first data packet is output to the one of the stationary units (111) and communication between the stationary unit (111) and a movable unit (103) is carried out using the first data packet, and wherein a second data packet is output to the same or a different stationary unit (111) and communication between the stationary unit (111) and a movable unit (103) is carried out using the second data packet, wherein the movable units (103) differ.

14. A controller (133) configured to carry out any of the methods of embodiments 1 to 13.

15. A computer program comprising program code which, when executed on a computer, causes the computer to carry out the method of embodiments 1 to 13.

16. A machine-readable storage medium comprising the computer program of embodiment 15.

17. A stationary unit (111) of a linear transport system (101), wherein the stationary unit (111) comprises a stator (109) with one or a plurality of drive coils for driving a rotor (113), wherein the stationary unit (111) comprises one or a plurality of stationary antennas (129), the stationary unit (111) being arranged to receive a data packet from a controller (133), the data packet comprising a control signal including identification information by which a stationary antenna (129) may be identified, and a data signal (300) to be transmitted, to select the stationary antenna (129) based on the identification information, and to transmit the data signal (300) via the stationary antenna (129), wherein the data signal (300) includes a start sequence (301), wherein the data signal (300) comprises a first communication frame (341) following the start sequence (301), wherein the first communication frame (341) comprises a start bit (311) and user data (302) to be transmitted.

18. The stationary unit (111) of embodiment 17, further configured to evaluate receipt information of a second communication frame (342) transmitted by the controller (133), transmit the receipt information via the selected stationary antenna (129), and receive the second communication frame (342) based on the receipt information.

19. The stationary unit (111) of any one of embodiments 17 or 18, further configured to output the start sequence (301) at a predetermined time based on a synchronization signal.

20. A movable unit (103) of a linear transport system (101), wherein the movable unit (103) comprises a movable antenna (131), wherein a rotor (113) is arranged on the movable unit (103) and comprises one or a plurality of magnets (117), wherein the movable unit (103) is configured to receive a data signal (300) via the movable antenna (131), wherein the data signal (300) includes a start sequence (301), wherein the data signal (300) comprises a start bit (311) subsequent to the start sequence (301), wherein the data signal (300) comprises user data (302) subsequent to the start bit (311), wherein the movable unit (103) is configured to identify the start sequence (301) and to subsequently record the user data (302) transmitted after the start bit (311).

21. The movable unit (103) of embodiment 20, further configured to receive receipt information of a second communication frame (342) and to transmit the second communication frame (342) based on the receipt information.

22. The movable unit (103) of embodiment 21, further configured to transmit status information (367) within the second communication frame (342).

23. The movable unit (103) of any one of embodiments 20 to 22, further configured to carry out a time synchronization based on the start sequence (301) using an additionally received time stamp.

24. A linear transport system (101) comprising a controller of embodiment 14, at least one stationary unit (111) of any one of embodiments 17 to 19, and a movable unit (103) of any one of embodiments 20 to 23, wherein the stator (109) and the rotor (113) form a linear motor (107).

25. A method for initializing a transport system, wherein the transport system comprises a controller (133), stationary units (111), and movable units (103), the stationary units (111) each having at least one stationary antenna (129), the movable units (103) each having a movable antenna (131), wherein the following steps are carried out by the controller (133):

determining position data of the movable antenna (131) of the movable unit (103), wherein the movable unit (103) is to be initialized;

selecting at least one stationary antenna (129) of one of the stationary units (111) within the transport system (101) based on the position data of the movable antenna (131);

outputting a data packet to the stationary unit (111), the data packet comprising an initialization sequence;

setting a unique allocation address of the movable unit (103).

26. The method of embodiment 25, wherein the initialization sequence comprises a ticket number, wherein at least two stationary antennas (129) are selected, wherein the movable antenna (131) is located within the area of influence of the two selected stationary antennas (129), wherein the data packet comprises a control information in such a way that the ticket number is to be output by each of the two selected stationary antennas (129) at least once at different times.

27. The method of embodiment 26, wherein the ticket number is issued multiple times by each of the selected stationary antennas (129).

28. The method of any one of embodiments 25 to 27, wherein control commands for a drive of the transport system are additionally output, wherein a drive of the transport system may be controlled based on the control commands such that the movable antenna (131) of the movable unit (103) to be initialized is moved into the sphere of influence of one or of a plurality of stationary antennas (129).

29. The method of any one of embodiments 25 to 28, wherein setting the unique allocation address of the movable unit (103) is carried out in such a way that a character string transmitted by the movable unit (103) to be initialized via the movable antenna (131) is stored as the unique allocation address.

30. The method of embodiment 29, wherein a 3-bit address (365) is subsequently output to the stationary unit (111), wherein the 3-bit address (365) is to be transmitted to the movable unit (103).

31. The method of any one of embodiments 25 to 28, wherein determining the unique allocation address is carried out in such a way that a character string and a 3-bit address (365) are determined by the controller (133) and output to the stationary unit (111), wherein the character string and the 3-bit address (365) are to be transmitted to the movable unit (103).

32. The method of any one of embodiments 25 to 31, wherein the method is repeated for a further movable unit (103).

33. A method for initializing a movable unit (103) in a transport system, wherein the transport system comprises a controller (133), stationary units (111), and movable units (103), the stationary units (111) each having at least one stationary antenna (129), the movable units (103) each having a movable antenna (131), comprising the following steps carried out by the movable unit (103):

receiving an initialization sequence with a ticket number;

incrementing a counter by one after each receipt of the initialization sequence with the ticket number;

comparing the counter with a preset value;

sending a unique allocation address when the counter exceeds the specified value.

34. The method of embodiment 33, wherein after the unique allocation address is sent out, a 3-bit address (365) is received.

TABLE 1

| List of reference signs | |
| --- | --- |
| 101 | Transport system |
| 103 | Movable unit |
| 105 | Guide rail |
| 107 | Linear motor |
| 109 | Stator |
| 111 | Stationary unit |
| 113 | Rotor |
| 117 | Magnet |
| 125 | Energy-transmitting coil |
| 127 | Energy-receiving coil |
| 129 | Stationary antenna |
| 131 | Movable antenna |
| 133 | Controller |
| 137 | Tool |
| 139 | Roller |
| 141 | Track surface |
| 143 | Position-detection element |
| 145 | Position sensor |
| 153 | Wireless data communication |
| 201 | first stationary antenna |
| 202 | second stationary antenna |
| 203 | third stationary antenna |
| 204 | fourth stationary antenna |
| 211 | first chip |
| 213 | second chip |
| 221 | first microcontroller |
| 223 | second microcontroller |
| 235 | Communication interface |
| 241 | first movable unit |
| 242 | second movable unit |
| 243 | third movable unit |
| 251 | first movable antenna |
| 252 | second movable antenna |
| 253 | third movable antenna |
| 300 | Data signal |
| 301 | Start sequence |
| 302 | User data |
| 303 | idle |
| 304 | Zero bit |
| 311 | Start bit |
| 312 | Inverted stop bit |
| 313 | switching edge |
| 321 | User data bit |
| 331 | first byte |
| 332 | second byte |
| 333 | first header data |
| 334 | second header data |
| 340 | Communication cycle |
| 341 | first communication frame |
| 342 | second communication frame |
| 343 | Switching pause |
| 360 | Header |
| 361 | 4-bit address |
| 362 | Telegram type |
| 363 | Communication control information |
| 364 | Cyclic redundancy check |
| 365 | 3-bit address |
| 366 | Communication status |
| 367 | Status information |

The invention claimed is:

1. A method for transferring data between a movable unit and a stationary unit of a linear transport system, wherein the linear transport system comprises a guide rail for guiding the movable unit, a plurality of stationary units, a controller, and a linear motor for driving the movable unit along the guide rail, and wherein the linear motor comprises a stator and a rotor, wherein the stator comprises the stationary units, each comprising one or a plurality of drive coils, wherein the rotor is arranged at the movable unit and comprises one or a plurality of magnets, wherein the stationary units each comprise at least a stationary antenna and a position sensor, and wherein the movable unit comprises a movable antenna and a position detection element;

wherein the following steps are carried out by the controller:

determining position data of the movable antenna of the movable unit, wherein the position data of the movable antenna includes a position of the movable unit relative to the stationary units, wherein the position detection element of the movable unit is detected by the position sensors of the stationary units;

selecting at least a stationary antenna within the plurality of stationary units based on the position data of the movable antenna of the movable unit, wherein the movable antenna of the movable unit is within a range of influence of the selected stationary antenna; and outputting a data packet to the stationary unit, wherein the data packet comprises a control signal, the control signal including identification information by which the selected stationary antenna is identifiable, and wherein the data packet comprises a data signal to be transmitted via the selected stationary antenna, wherein the data signal comprises a start sequence, the start sequence being arranged to trigger a data receipt of the movable unit, and wherein the data signal comprises a first communication frame following the start sequence, the first communication frame comprising a start bit and user data to be transmitted.

2. The method of claim 1, wherein the start sequence comprises a plurality of switching edges and at least three inverted stop bits.

3. The method of claim 2, wherein the start sequence comprises the decimal byte value 85.

4. The method of claim 1, wherein the first communication frame comprises first header data, the first header data including information about a telegram type, wherein the first communication frame is set based on the telegram type.

5. The method of claim 4, wherein the telegram type comprises receipt information of a second communication frame.

6. The method of claim 1, wherein the first communication frame comprises a timestamp.

7. The method of claim 1, wherein a first data packet is output to the one of the stationary units and communication between the stationary unit and a movable unit is carried out using the first data packet, and wherein a second data packet is output to the same or a different stationary unit and communication between the stationary unit and a movable unit is carried out using the second data packet, wherein the movable units differ.

8. A controller configured to carry out the method of claim 1.

9. A linear transport system comprising a controller according to claim 8, and at least one stationary unit, the stationary comprising a stator with one or a plurality of drive coils for driving a rotor, wherein the stationary unit comprises one or a plurality of stationary antennas, the stationary unit being configured to:

receive a data packet from a controller, the data packet comprising a control signal including identification information by which a stationary antenna is identifiable, and a data signal to be transmitted, select the stationary antenna based on the identification information, and transmit the data signal via the stationary antenna, wherein the data signal includes a start sequence, wherein the data signal comprises a first communication frame following the start sequence, and wherein the first communication frame comprises a start bit and user data to be transmitted; and a movable unit, the movable unit comprising a movable antenna, wherein a rotor is arranged on the movable unit and comprises one or a plurality of magnets, wherein the movable unit is configured to receive a data signal via the movable antenna, wherein the data signal includes a start sequence, wherein the data signal comprises a start bit subsequent to the start sequence, wherein the data signal comprises user data subsequent to the start bit, and wherein the movable unit is configured to identify the start sequence and to subsequently record the user data transmitted after the start bit, wherein the stator and the rotor form a linear motor.

10. A computer processor and memory configured to execute a computer program comprising program code which, when executed on the computer processor, causes the computer processor to carry out the method of claim 1.

11. A non-transitory, machine-readable data storage medium comprising computer program code stored thereon, executable by a computer processor to perform the method of claim 1.

12. A stationary unit of a linear transport system, wherein the stationary unit comprises a stator with one or a plurality of drive coils for driving a rotor, and wherein the stationary unit comprises one or a plurality of stationary antennas, the stationary unit being configured to:

receive a data packet from a controller, the data packet comprising a control signal including identification information by which a stationary antenna is identifiable, and a data signal to be transmitted, select the stationary antenna based on the identification information, and transmit the data signal to a movable antenna of a movable unit of the linear transport system via the stationary antenna, wherein the data signal includes a start sequence, wherein the data signal comprises a first communication frame following the start sequence, and wherein the first communication frame comprises a start bit and user data to be transmitted.

13. The stationary unit of claim 12, further configured to evaluate receipt information of a second communication frame transmitted by the controller, transmit the receipt information via the selected stationary antenna, and receive the second communication frame based on the receipt information.

14. The stationary unit of claim 12, further configured to output the start sequence at a predetermined time based on a synchronization signal, wherein the stationary unit comprises a synchronized clock for this purpose, the synchronized clock being synchronized with a controller.

15. A movable unit of a linear transport system, wherein the movable unit comprises a movable antenna, wherein a rotor is arranged on the movable unit and comprises one or a plurality of magnets, wherein the movable unit is configured to receive a data signal via the movable antenna, wherein the data signal includes a start sequence, wherein the data signal comprises a start bit subsequent to the start sequence, wherein the data signal comprises user data subsequent to the start bit, wherein the movable unit is configured to identify the start sequence and to subsequently record the user data transmitted after the start bit;

wherein the stationary unit comprises a stator with one or a plurality of drive coils for driving a rotor, and wherein a stationary unit comprises one or a plurality of stationary antennas, the stationary unit being configured to:

receive the data packet from a controller, the data packet comprising a control signal including identification information by which the stationary antenna is identifiable, and the data signal to be transmitted, select the stationary antenna based on the identification information, and transmit the data signal to a movable antenna of a movable unit of the linear transport system via the stationary antenna.

16. The movable unit of claim 15, further configured to carry out a time synchronization based on the start sequence using an additionally received time stamp.

17. A method for initializing a transport system, wherein the transport system comprises a controller, stationary units, and movable units, the stationary units each having at least one stationary antenna and a position sensor, the movable units each having a movable antenna and a position detection element, and wherein the following steps are carried out by the controller:

determining position data of the movable antenna of the movable unit, wherein the position data of the movable antenna includes a position of the movable unit relative to the stationary units, wherein the position detection element of the movable unit is detected by the position sensors of the stationary units; wherein the movable unit is to be initialized;

selecting at least one stationary antenna of one of the stationary units within the transport system based on the position data of the movable antenna of the movable unit, wherein the movable antenna of the movable unit is within a range of influence of the selected stationary antenna;

outputting a data packet to the stationary unit, the data packet comprising an initialization sequence; and setting a unique allocation address of the movable unit.

18. The method of claim 17, wherein the initialization sequence comprises a ticket number, wherein at least two stationary antennas are selected, wherein the movable antenna is located within the area of influence of the two selected stationary antennas, and wherein the data packet comprises a control information in such a way that the ticket number is to be output by each of the two selected stationary antennas at least once at different times.

19. The method of claim 17, wherein the ticket number is issued multiple times by each of the selected stationary antennas.

20. A method for initializing a movable unit in a transport system, wherein the transport system comprises a controller, stationary units, and movable units, the stationary units each having at least one stationary antenna, the movable units each having a movable antenna;

wherein the following steps are carried out by the controller:

determining position data of the movable antenna of the movable unit, wherein the position data of the movable antenna includes a position of the movable unit relative to the stationary units, wherein the position detection element of the movable unit is detected by the position sensors of the stationary units; wherein the movable unit is to be initialized;

selecting at least one stationary antenna of one of the stationary units within the transport system based on the position data of the movable antenna of the movable unit, wherein the movable antenna of the movable unit is within a range of influence of the selected stationary antenna;

outputting a data packet to the stationary unit, the data packet comprising an initialization sequence with a ticket number; and setting a unique allocation address of the movable unit;

wherein the following steps are carried out by the movable unit:

receiving the initialization sequence with the ticket number;

incrementing a counter by one after each receipt of the initialization sequence with the ticket number;

comparing the counter with a preset value; and sending a unique allocation address when the counter exceeds the specified value.

\* \* \* \* \*